United States Patent
Shin et al.

(10) Patent No.: US 11,481,135 B2
(45) Date of Patent: Oct. 25, 2022

(54) STORAGE DEVICE AND METHOD OF OPERATING THE STORAGE DEVICE

(71) Applicant: SK hynix Inc., Icheon-si (KR)

(72) Inventors: Beom Ju Shin, Suwon-si (KR); Yun Jung Yeom, Gunpo-si (KR)

(73) Assignee: SK hynix Inc., Icheon-si (KR)

( * ) Notice: Subject to any disclaimer, the term of this patent is extended or adjusted under 35 U.S.C. 154(b) by 120 days.

(21) Appl. No.: 16/823,155

(22) Filed: Mar. 18, 2020

(65) Prior Publication Data
US 2021/0064263 A1    Mar. 4, 2021

(30) Foreign Application Priority Data

Sep. 2, 2019 (KR) .................. 10-2019-0108316

(51) Int. Cl.
| | | |
|---|---|---|
| G06F 3/06 | (2006.01) | |
| G06F 12/02 | (2006.01) | |
| G06F 13/16 | (2006.01) | |
| G11C 11/56 | (2006.01) | |

(52) U.S. Cl.
CPC .......... *G06F 3/0647* (2013.01); *G06F 3/0604* (2013.01); *G06F 3/064* (2013.01); *G06F 3/0652* (2013.01); *G06F 3/0659* (2013.01); *G06F 3/0673* (2013.01)

(58) Field of Classification Search
None
See application file for complete search history.

(56) References Cited

U.S. PATENT DOCUMENTS

| | | | | |
|---|---|---|---|---|
| 2013/0124787 A1* | 5/2013 | Schuette | ............ | G11C 16/0483 |
| | | | | 711/103 |
| 2014/0032817 A1* | 1/2014 | Bux | .................... | G06F 12/0261 |
| | | | | 711/103 |
| 2014/0052897 A1* | 2/2014 | Goss | .................. | G06F 12/0246 |
| | | | | 711/103 |

FOREIGN PATENT DOCUMENTS

| | | |
|---|---|---|
| KR | 1020150020385 A | 2/2015 |
| KR | 101635446 B1 | 7/2016 |
| KR | 1020170015708 A | 2/2017 |
| KR | 1020180020706 A | 2/2018 |

* cited by examiner

*Primary Examiner* — Michael Alsip
(74) *Attorney, Agent, or Firm* — William Park & Associates Ltd.

(57) ABSTRACT

A memory controller may control a memory device including a first storage area and a second storage area. The memory controller may include: a memory operation controller and a block information manager. The memory operation controller may control the memory device to perform a block merge operation of programming data stored in a victim block among normal blocks of the first storage area to a target block among the normal blocks, and perform a data migration operation of copying data stored in blocks of the first storage area to blocks of the second storage area. The block information manager may store block map information indicating whether each of the blocks of the first storage area is a normal block or a merge block. The target block may be changed from a normal block to a merge block by the block merge operation.

24 Claims, 17 Drawing Sheets

US 11,481,135 B2

STORAGE DEVICE AND METHOD OF OPERATING THE STORAGE DEVICE

CROSS-REFERENCE TO RELATED APPLICATION

The present application claims priority under 35 U.S.C. § 119(a) to 35 U.S.C. § 119(a) to Korean patent application number 10-2019-0108316 filed on Sep. 2, 2019, the entire disclosure of which is incorporated herein by reference.

BACKGROUND

1. Technical Field

Various embodiments of the present disclosure generally relate to an electronic device, and more particularly, to a storage device and a method of operating the storage device.

2. Related Art

Generally, a storage device is a device which stores data under control of a host device such as a computer or a smartphone. The storage device may include a memory device configured to store data, and a memory controller configured to control the memory device. Memory devices are mainly classified into volatile memory devices and nonvolatile memory devices.

A volatile memory device is a memory device, which stores data only when power is supplied thereto, and in which data stored therein is lost when power is turned off. Examples of a volatile memory device include a static random access memory (SRAM), and a dynamic random access memory (DRAM).

A nonvolatile memory device is a memory device in which data stored therein is maintained even when power is turned off. Examples of a nonvolatile memory device include a read-only memory (ROM), a programmable ROM (PROM), an electrically programmable ROM (EPROM), an electrically erasable programmable ROM (EEPROM), and a flash memory.

SUMMARY

An embodiment of the present disclosure may provide for a memory controller configured to control a memory device including a first storage area and a second storage area. The memory controller may include a memory operation controller and a block information manager. The memory operation controller may control the memory device to perform a block merge operation of programming data stored in a victim block among normal blocks of the first storage area to a target block among the normal blocks, and control the memory device to perform a data migration operation of copying data stored in blocks of the first storage area to blocks of the second storage area. The block information manager may store block map information indicating whether each of the blocks of the first storage area is a normal block or a merge block. The target block may be changed from a normal block to a merge block by the block merge operation.

An embodiment of the present disclosure may provide for storage device including a memory device and a memory controller. The memory device may include a first storage area and a second storage area. The memory controller may control the memory device to perform a block merge operation of selecting a victim block and a target block from among normal blocks of the first storage area and programming data stored in the victim block to the target block, and control the memory device to perform a data migration operation of copying data stored in blocks of the first storage area to blocks of the second storage area.

An embodiment of the present disclosure may provide for a method of operating a storage device including a first storage area and a second storage area. The method may include: performing a block merge operation of programming data stored in a victim block among normal blocks of the first storage area to a target block among the normal blocks; and performing a data migration operation of copying data stored in blocks of the first storage area to blocks of the second storage area. The target block may be changed from a normal block to a merge block by the block merge operation.

DETAILED DESCRIPTION

Hereinafter, embodiments of the present disclosure will be described with reference to the attached drawings.

Various embodiments of the present disclosure are directed to a storage device having improved buffer area management performance, and a method of operating the storage device.

Figure 1:
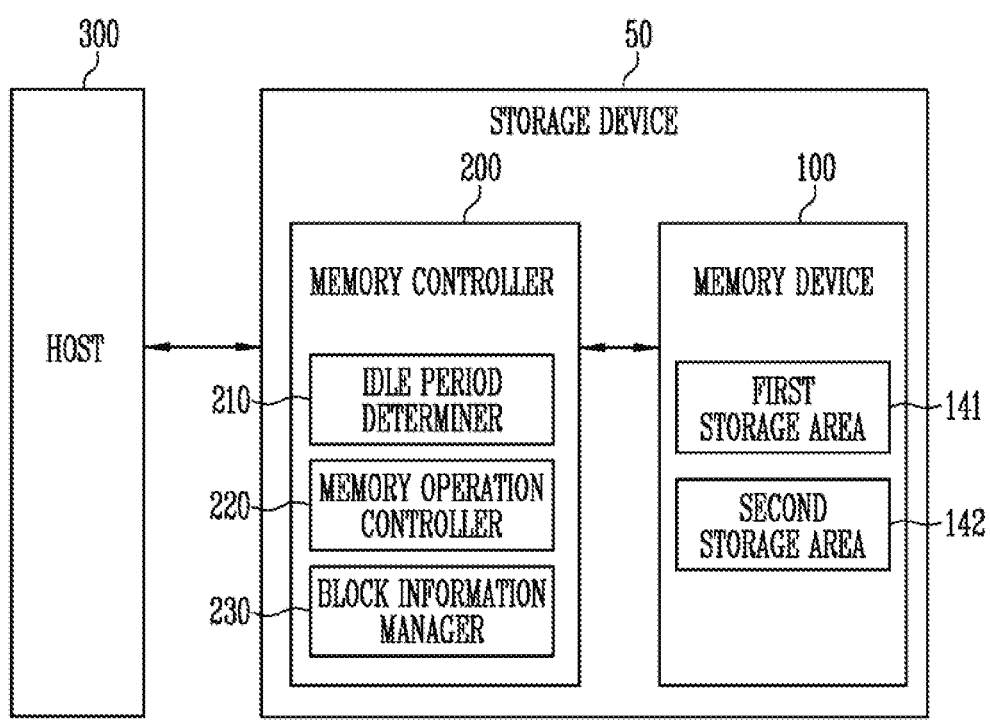
FIG. 1 is a diagram illustrating a storage device in accordance with an embodiment of the present disclosure.

FIG. 1 is a diagram illustrating a storage device 50 in accordance with an embodiment of the present disclosure.

Referring to FIG. 1, the storage device 50 may include a memory device 100 and a memory controller 200 configured to control the operation of the memory device 100. The storage device 50 may be a device configured to store data under control of a host 300 such as a cellular phone, a smartphone, an MP3 player, a laptop computer, a desktop computer, a game machine, a TV, a tablet PC, or an in-vehicle infotainment system.

The storage device 50 may be manufactured as any one of various kinds of storage devices depending on a host interface, which is a communication system for communicating with the host 300. For example, the data storage device 50 may be configured of any one of various kinds of storage devices such as an SSD, MMC, eMMC, RS-MMC, or micro-MMC type multimedia card, an SD, mini-SD, micro-SD type secure digital card, a universal serial bus (USB) storage device, a universal flash storage (UFS) device, a personal computer memory card international association (PCMCIA) card type storage device, a peripheral component interconnection (PCI) card type storage device, a PCI-express (PCI-E) type storage device, a compact flash (CF) card, a smart media card, and a memory stick.

The storage device 50 may be manufactured in the form of any one of various package types. For instance, the storage device 50 may be manufactured in the form of any one of various package types such as a package on package (POP) type, a system in package (SIP) type, a system on chip (SOC) type, a multi-chip package (MCP) type, a chip on board (COB) type, a wafer-level fabricated package (WFP) type, and a wafer-level stack package (WSP) type.

The memory device 100 may store data therein. The memory device 100 may operate under control of the memory controller 200. The memory device 100 may include a memory cell array including a plurality of memory cells configured to store data therein.

The memory cells may include a single-level cell (SLC) capable of storing a single data bit, a multi-level cell (MLC) capable of storing two data bits, a triple-level cell (TLC) capable of storing three data bits, or a quad-level cell (QLC) capable of storing four data bits.

The memory cell array may include a plurality of memory blocks. Each memory block may include a plurality of memory cells. Each memory block may include a plurality of pages. In an embodiment, each page may be the unit of storing data in the memory device 100 or reading stored data from the memory device 100.

Each memory block may be the unit of erasing data. In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory device, a resistive random access memory (RRAM), a phase-change memory (PRAM), a magnetoresistive random access memory (MRAM), a ferroelectric random access memory (FRAM), or a spin transfer torque random access memory (STT-RAM). In this specification, for the sake of explanation, it is assumed that the memory device 100 is a NAND flash memory.

The memory device 100 may receive a command and an address from the memory controller 200 and access an area of the memory cell array that is selected by the address. In other words, the memory device 100 may perform an operation instructed by the command on the area selected by the address. For example, the memory device 100 may perform a write (program) operation, a read operation, and an erase operation. During a program operation, the memory device 100 may program data to an area selected by an address. During a read operation, the memory device 100 may read data from an area selected by an address. During an erase operation, the memory device 100 may erase data from an area selected by an address.

In an embodiment, the memory device 100 may include a first storage area 141 including first blocks, and a second storage area 142 including second blocks. The first storage area 141 may include a predetermined number of first blocks. Each of the first blocks may be a normal block or a merge block. The merge block may be a block configured to store merge data by a block merge operation. For example, if a block merge operation of programming data stored in a first block of two normal blocks to a second block of the two normal blocks is performed, the second block may be changed from a normal block to a merge block.

In an embodiment, the normal blocks of the first storage area 141 may include memory cells each of which is capable of storing n bits (n is a natural number of 1 or more). The second blocks may include memory cells each of which is capable of storing m bits (m is a natural number greater than n).

In an embodiment, an operation of migrating data stored in the blocks of the first storage area 141 to the blocks of the second storage area 142 may be a data migration operation. For example, data stored in selected blocks of the first storage area 141 may be copied to blocks of the second storage area 142. Thereafter, the selected blocks of the first storage area 141 may be used as free blocks for storing other input data.

The memory controller 200 may control overall operations of the storage device 50.

When power is applied to the storage device 50, the memory controller 200 may execute firmware (FW). In the case where the memory device 100 is a flash memory device, the memory controller 200 may execute firmware such as a flash translation layer (FTL) for controlling communication between the host 300 and the memory device 100.

In an embodiment, the memory controller 200 may receive data and a logical block address (LBA) from the host 300, and translate the LBA into a physical block address (PBA) indicating addresses of memory cells to which data is to be stored, the memory cells being included in the memory device 100.

The memory controller 200 may control the memory device 100 to perform a program operation, a read operation, or an erase operation in response to a request from the host 300. During the program operation, the memory controller 200 may provide a program command, a PBA, and data to the memory device 100. During the read operation, the memory controller 200 may provide a read command and a PBA to the memory device 100. During the erase operation, the memory controller 200 may provide an erase command and a PBA to the memory device 100.

In an embodiment, the memory controller 200 may autonomously generate a command, an address and data regardless of a request from the host 300, and transmit them to the memory device 100. For example, the memory controller 200 may provide a command, an address and data to the memory device 100 to perform background operations such as a program operation for wear leveling, and a program operation for garbage collection.

In an embodiment, the memory controller 200 may control at least two or more memory devices 100. In this case, the memory controller 200 may control the memory devices 100 in an interleaving manner to enhance the operating performance. The interleaving scheme may be an operating scheme of overlapping operating periods of at least two or more memory devices 100.

In an embodiment, the memory controller 200 may include an idle period determiner 210, a memory operation controller 220, and a block information manager 230.

The idle period determiner 210 may predict an idle period of the memory device 100 based on a state of the memory device 100.

The idle period may be a period in which the memory device 100 does not perform an operation corresponding to a request from the host 300. For example, the idle period may be a period from when an operation corresponding to a request input from the host 300 is completed to when a new request is input from the host 300. Alternatively, the idle period may be a period from when a command queue empties to when a new command is input in response to a request from the host 300.

The idle period determiner 210 may predict a current idle period based on previous idle period values of the memory device 100. The idle period determiner 210 may provide information about the predicted idle period to the memory operation controller 200.

In an embodiment, the memory operation controller 220 may control the memory device 100 to perform a block merge operation. The block merge operation may be an operation of programming data stored in one of two normal blocks of the first storage area 141 to the other normal block to merge the data of the two normal blocks.

For example, the memory operation controller 220 may select a victim block and a target block from among normal blocks of the first storage area 141. The memory operation controller 220 may select the victim block and the target block during a block merge operation based on block aging information or program-erase cycle information that is provided from the block information manager 230.

The memory operation controller 220 may control the memory device 100 to program data stored in the victim block to the target block. The target block on which the block merge operation has been performed may be changed from a normal block to a merge block. The merge block may be a memory block which stores merged data.

After the block merge operation has been performed, the victim block may be changed from a data block to a free block. The data block may be a block which stores valid data. The free block may be a block which does not store valid data. In other words, due to the block merge operation, a new free block may be secured in the first storage area 141. In an embodiment, changing a victim block from a data block to a free block includes changing block map information to indicate that the victim block is now a free block.

The memory operation controller 220 may control the memory device 100 such that the victim block is erased to store new data in the victim block after the block merge operation has been performed.

In an embodiment, the memory operation controller 220 may control the memory device 100 to perform a data migration operation. The data migration operation may be an operation of migrating data stored in blocks of the first storage area 141 to blocks of the second storage area 142.

For example, the memory operation controller 220 may control the memory device 100 to copy data stored in at least two or more blocks among the blocks of the first storage area 141 to a block of the second storage area 142.

After the data migration operation has been performed, at least two or more blocks may be changed from data blocks to free blocks. In other words, due to the block migration operation, two or more new free blocks may be secured in the first storage area 141.

The memory operation controller 220 may control the memory device 100 such that the at least two or more selected blocks are erased to store new data in the at least two or more selected blocks.

In an embodiment, the memory operation controller 220 may control the memory device 100 to perform a block merge operation or a data migration operation based on the idle period predicted by the idle period determiner 210.

For example, the memory operation controller 220 may control the memory device 100 to perform a block merge operation if the predicted idle period is equal to or greater than a first threshold value and less than a second threshold value. The memory operation controller 220 may control the memory device 100 to perform a data migration operation if the predicted idle period is equal to or greater than the second threshold value.

In an embodiment, the memory operation controller 220 may control the memory device 100 to perform a block merge operation or a data migration operation based on block map information provided from the block information manager 230.

For example, the memory operation controller 220 may control the memory device 100 to perform a data migration operation if the number of free blocks included in the first storage area 141 is equal to or less than a first threshold number. The memory operation controller 220 may control the memory device 100 to perform a block merge operation if the number of free blocks included in the first storage area 141 is greater than the first threshold number and equal to or less than a second threshold number.

For example, the memory operation controller 220 may control the memory device 100 to perform a data migration operation if the number of merge blocks included in the first storage area 141 is equal to or greater than a reference number.

In an embodiment, the block information manager 230 may store and update information about the blocks of the first storage area 141.

The block information manager 230 may store block map information. The block map information may indicate whether each of the blocks of the first storage area 141 is a normal block or a merge block. The merge block may be a memory block which store data obtained by merging data stored in two normal blocks.

The block map information may indicate whether each of the blocks of the first storage area 141 is a data block or a free block. The data block may be a memory block which stores valid data. The free block may be a memory block which does not store valid data. The free block may be a memory block which stores only invalid data.

The block information manager 230 may store block aging information. The block aging information may indicate a final program elapsed time that is the time elapsed after a last program operation of each of normal blocks of the first storage area 141 has been performed.

The block information manager 230 may store program-erase cycle information. The block aging information may indicate a program-erase cycle of each of the normal blocks of the first storage area 141.

The block information manager 230 may provide the block map information, the block aging information, and the program-erase cycle information to the memory operation controller 220.

The host 300 may communicate with the storage device 50 using at least one of various communication methods such as universal serial bus (USB), serial AT attachment (SATA), serial attached SCSI (SAS), high speed interchip (HSIC), small computer system interface (SCSI), peripheral component interconnection (PCI), PCI express (PCIe), non-volatile memory express (NVMe), universal flash storage (UFS), secure digital (SD), multimedia card (MMC), embedded MMC (eMMC), dual in-line memory module (DIMM), registered DIMM (RDIMM), and load reduced DIMM (LRDIMM) communication methods.

Figure 2:
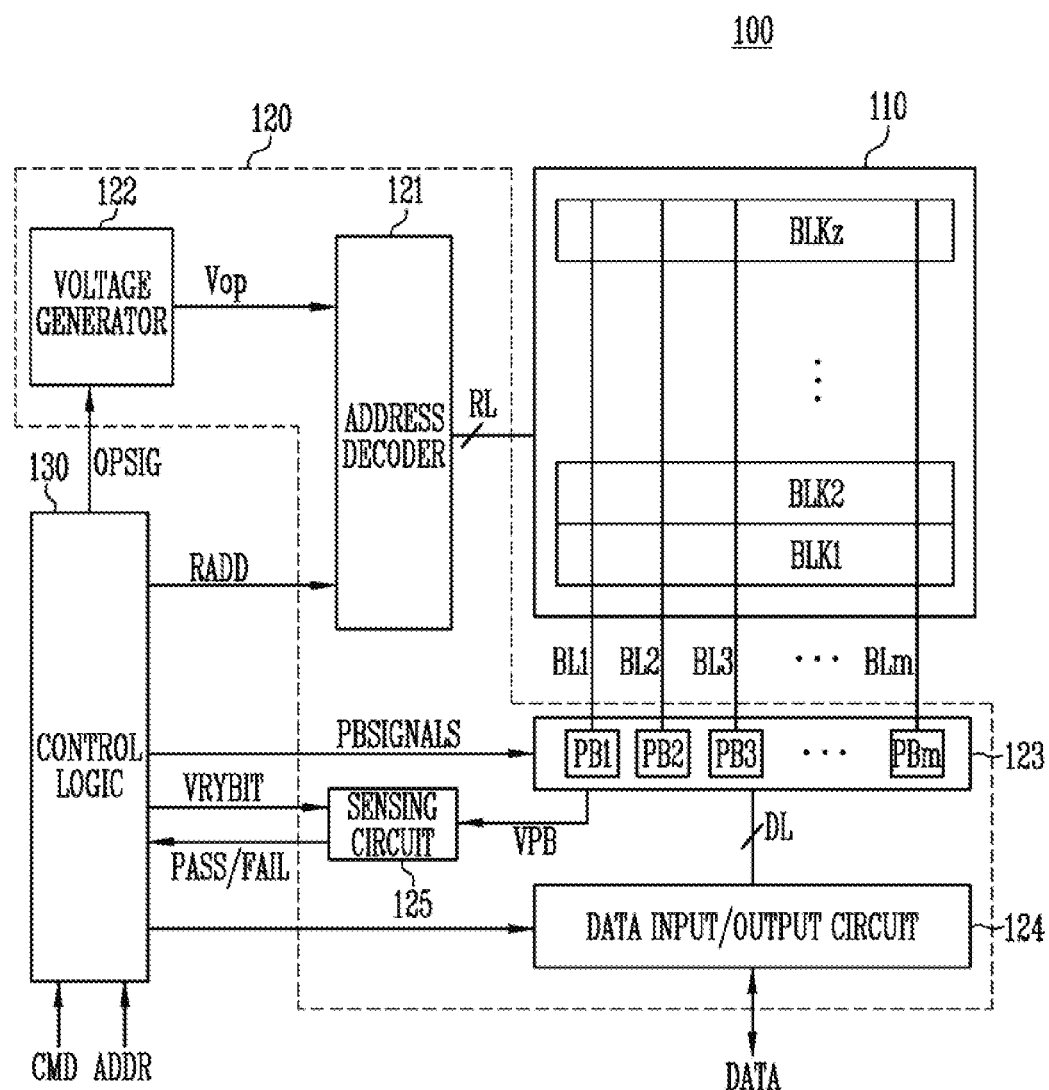
FIG. 2 is a diagram illustrating the configuration of a memory device of FIG. 1.

FIG. 2 is a diagram illustrating the configuration of the memory device 100 of FIG. 1.

Referring to FIG. 2, the memory device 100 may include a memory cell array 110, a peripheral circuit 120, and control logic 130. The control logic 130 may be implemented as hardware, software, or a combination of hardware and software. For example, the control logic 130 may be a control logic circuit operating in accordance with an algorithm and/or a processor executing control logic code.

The memory cell array 110 may include a plurality of memory blocks BLK1 to BLKz. The plurality of memory blocks BLK1 to BLKz are coupled to the address decoder 121 through the row lines RL. The memory blocks BLK1 to BLKz may be coupled to the read/write circuit 123 through bit lines BL1 to BLm. Each of the memory blocks BLK1 to BLKz may include a plurality of memory cells. In an embodiment, the plurality of memory cells may be nonvolatile memory cells. Memory cells coupled to the same word line among the plurality of memory cells are defined as one page. In other words, the memory cell array 110 may be formed of a plurality of physical pages. In an embodiment, each of the memory blocks BLK1 to BLKz included in the memory cell array 110 may include a plurality of dummy cells. One or more dummy cells may be coupled in series between a drain select transistor and memory cells and between a source select transistor and the memory cells.

Each of the memory cells of the memory device 100 may be formed of a single-level cell (SLC) capable of storing a single data bit, a multi-level cell (MLC) capable of storing two data bits, a triple-level cell (TLC) capable of storing three data bits, or a quad-level cell (QLC) capable of storing four data bits.

The peripheral circuit 120 may include an address decoder 121, a voltage generator 122, a read/write circuit 123, a data input/output circuit 124, and a sensing circuit 125.

The peripheral circuit 120 may drive the memory cell array 110. For example, the peripheral circuit 120 may drive the memory cell array 110 to perform a program operation, a read operation, or an erase operation.

The address decoder 121 is coupled to the memory cell array 110 through the row lines RL. The row lines RL may include drain select lines, word lines, source select lines, and a common source line. In an embodiment, the word lines may include normal word lines and dummy word lines. In an embodiment, the row lines RL may further include a pipe select line.

In an embodiment, the row lines RL may be local lines included in local line groups. Each local line group may correspond to one memory block. The local line group may include a drain select line, local word lines, and a source select line.

The address decoder 121 may operate under control of the control logic 130. The address decoder 121 may receive addresses ADDR from the control logic 130.

The address decoder 121 may decode a block address among the received addresses ADDR. The address decoder 121 may select at least one of the memory blocks BLK1 to BLKz according to the decoded block address. The address decoder 121 may decode a row address RADD among the received addresses ADDR. The address decoder 121 may select at least one word line WL of the selected memory block by applying voltages supplied from the voltage generator 122 to at least one word line WL according to the decoded row address RADD.

During a program operation, the address decoder 121 may apply a program voltage to a selected word line and apply a pass voltage having a level lower than that of the program voltage to unselected word lines. During a program verify operation, the address decoder 121 may apply a verify voltage to a selected word line and apply a verify pass voltage having a level higher than that of the verify voltage to unselected word lines.

During a read operation, the address decoder 121 may apply a read voltage to a selected word line and apply a read pass voltage having a level higher than that of the read voltage to unselected word lines.

In an embodiment, an erase operation of the memory device 100 may be performed on a memory block basis. During the erase operation, an address ADDR to be input to the memory device 100 includes a block address. The address decoder 121 may decode the block address and select a corresponding memory block according to the decoded block address. During the erase operation, the address decoder 121 may apply a ground voltage to word lines coupled to the selected memory block.

In an embodiment of the present disclosure, the address decoder 121 may decode a column address among the transmitted addresses ADDR. The decoded column address may be transmitted to the read/write circuit 123. For example, the address decoder 121 may include components such as a row decoder, a column decoder, and an address buffer.

The voltage generator 122 may generate a plurality of operating voltages Vop using an external supply voltage supplied to the memory device 100. The voltage generator 122 may operate under control of the control logic 130.

In an embodiment, the voltage generator 122 may generate an internal supply voltage by regulating the external supply voltage. The internal supply voltage generated from the voltage generator 122 may be used as an operating voltage of the memory device 100.

In an embodiment, the voltage generator 122 may generate a plurality of operating voltages Vop using an external supply voltage or an internal supply voltage. The voltage generator 122 may generate various voltages required from the memory device 100. For example, the voltage generator 122 may generate a plurality of erase voltages, a plurality of program voltages, a plurality of pass voltages, a plurality of select read voltages, and a plurality of unselect read voltages.

The voltage generator 122 may include, to generate a plurality of operating voltages Vop having various voltage levels, a plurality of pumping capacitors configured to receive an internal supply voltage, and may generate a plurality of operating voltages Vop by selectively enabling the plurality of pumping capacitors under control of the control logic 130.

The generated operating voltages Vop may be supplied to the memory cell array 110 by the address decoder 121.

The read/write circuit 123 may include first to m-th page buffers PB1 to PBm. The first to m-th page buffers PB1 to PBm may be coupled to the memory cell array 110 through the first to m-th bit lines BL1 to BLm, respectively. The first to m-th page buffers PB1 to PBm may operate under control of the control logic 130.

The first to m-th page buffers PB1 to PBm may communicate data DATA with the data input/output circuit 124. During a program operation, the first to m-th page buffers PB1 to PBm may receive data DATA to be stored through the data input/output circuit 124 and data lines DL.

During a program operation, the first to m-th page buffers PB1 to PBm may transmit the data DATA, received through the data input/output circuit 124, to selected memory cells through the bit lines BL1 to BLm when a program pulse is applied to a selected word line. The memory cells in the selected page are programmed based on the transmitted data DATA. Memory cells coupled to a bit line to which a program enable voltage (e.g. a ground voltage) is applied may have increased threshold voltages. Threshold voltages of memory cells coupled to a bit line to which a program inhibit voltage (for example, a supply voltage) is applied may be retained. During a program verify operation, the first to m-th page buffers PB1 to PBm may read data DATA from selected memory cells through the bit lines BL1 to BLm.

During a read operation, the read/write circuit 123 may read data DATA from the memory cells of the selected page through the bit lines BL, and store the read data DATA in the first to m-th page buffers PB1 to PBm.

During an erase operation, the read/write circuit 123 may float the bit lines BL. In an embodiment, the read/write circuit 123 may include a column select circuit.

The data input/output circuit 124 is coupled to the first to m-th page buffers PB1 to PBm through the data lines DL. The data input/output circuit 124 may operate under control of the control logic 130.

The data input/output circuit 124 may include a plurality of input/output buffers (not shown) for receiving input data DATA. During a program operation, the data input/output circuit 124 may receive data DATA to be stored from an external controller (not shown). During a read operation, the data input/output circuit 124 may output, to the external controller, the data DATA received from the first to m-th page buffers PB1 to PBm included in the read/write circuit 123.

During a read operation or a verify operation, the sensing circuit 125 may generate reference current in response to an enable bit signal VRYBIT generated by the control logic 130, compare a sensing voltage VPB received from the read/write circuit 123 with a reference voltage generated by the reference current, and output a pass signal or a fail signal to the control logic 130.

The control logic 130 may be coupled to the address decoder 121, the voltage generator 122, the read/write circuit 123, the data input/output circuit 124, and the sensing circuit 125. The control logic 130 may control the overall operation of the memory device 100. The control logic 130 may operate in response to a command CMD transmitted from an external device.

The control circuit 130 may generate various signals in response to the command CMD and the address ADD and control the peripheral circuit 120. For example, the control logic 130 may generate an operating signal OPSIG, a row address RADD, a read/write circuit control signal PBSIGNALS, and an enable bit VRYBIT in response to the command CMD and the address ADD. The control logic 130 may output the operating signal OPSIG to the voltage generator 122, output the row address RADD to the address decoder 121, output the read/write control signal to the read/write circuit 123, and output the enable bit VRYBIT to the sensing circuit 125. The control logic 130 may determine whether target memory cells have passed or failed a verification during the verify operation in response to a pass signal PASS or a fail signal FAIL that is output from the sensing circuit 125.

Figure 3:
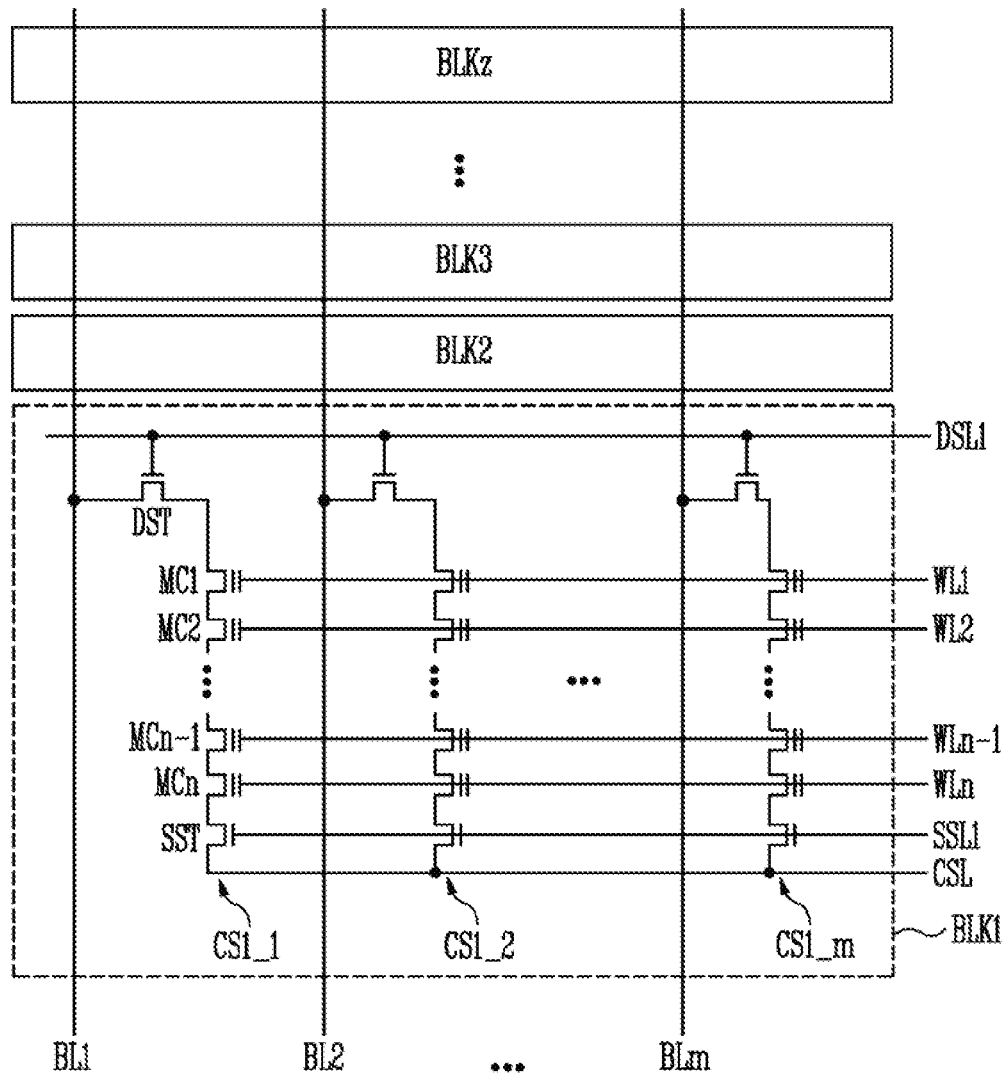
FIG. 3 is a diagram illustrating a memory cell array of FIG. 2.

FIG. 3 is a diagram illustrating the memory cell array 110 of FIG. 2.

Referring to FIG. 3, the first to z-th memory blocks BLK1 to BLKz are connected in common to the first to m-th bit lines BL1 to BLm. In FIG. 3, for the sake of explanation, elements of only the first memory block BLK1 among the plurality of memory blocks BLK1 to BLKz are illustrated, and illustration of elements of each of the other memory blocks BLK2 to BLKz is omitted. It will be understood that each of the memory blocks BLK2 to BLKz has the same configuration as that of the first memory block BLK1.

The memory block BLK1 may include a plurality of cell strings CS1_1 to CS1_$m$ (m is a positive integer). The first to m-th cell strings CS1_1 to CS1_$m$ are respectively coupled to the first to m-th bit lines BL1 to BLm. Each of the first to m-th cell strings CS1_1 to CS1_$m$ includes a drain select transistor DST, a plurality of memory cells MC1 to MCn (n is a positive integer) coupled in series to each other, and a source select transistor SST.

A gate terminal of the drain select transistor DST included in each of the first to m-th cell strings CS1_1 to CS1_$m$ is coupled to a drain select line DSL1. Gate terminals of the first to n-th memory cells MC1 to MCn included in each of the first to m-th cell strings CS1_1 to CS1_$m$ are respectively coupled to the first to n-th word lines WL1 to WLn. A gate terminal of the source select transistor SST included in each of the first to m-th cell strings CS1_1 to CS1_$m$ is coupled to a source select line SSL1.

For the sake of explanation, the configuration of each cell string will be described based on the first cell string CS1_1 of the plurality of cell strings CS1_1 to CS1_$m$. It will be understood that each of the other cell strings CS1_1 to CS1_$m$ has the same configuration as that of the first cell string CS1_1.

A drain terminal of the drain select transistor DST included in the first cell string CS1_1 is coupled to the first bit line BL1. A source terminal of the drain select transistor DST included in the first cell string CS1_1 is coupled to a drain terminal of the first memory cell MC1 included in the first cell string CS1_1. The first to n-th memory cells MC1 to MCn are coupled in series to each other. A drain terminal of the source select transistor SST included in the first cell string CS1_1 is coupled to a source terminal of the n-th memory cell MCn included in the first cell string CS1_1. A source terminal of the source select transistor SST included in the first cell string CS1_1 is coupled to a common source line CSL. In an embodiment, the common source line CSL may be coupled in common to the first to z-th memory blocks BLK1 to BLKz.

The drain select line DSL1, the first to n-th word lines WL1 to WLn, and the source select line SSL1 are included in the row lines RL of FIG. 2. The drain select line DSL1, the first to n-th word lines WL1 to WLn, and the source select line SSL1 are controlled by the address decoder 121. The common source line CSL is controlled by the control logic 130. The first to m-th bit lines BL1 to BLm are controlled by the read/write circuit 123.

Figure 4:
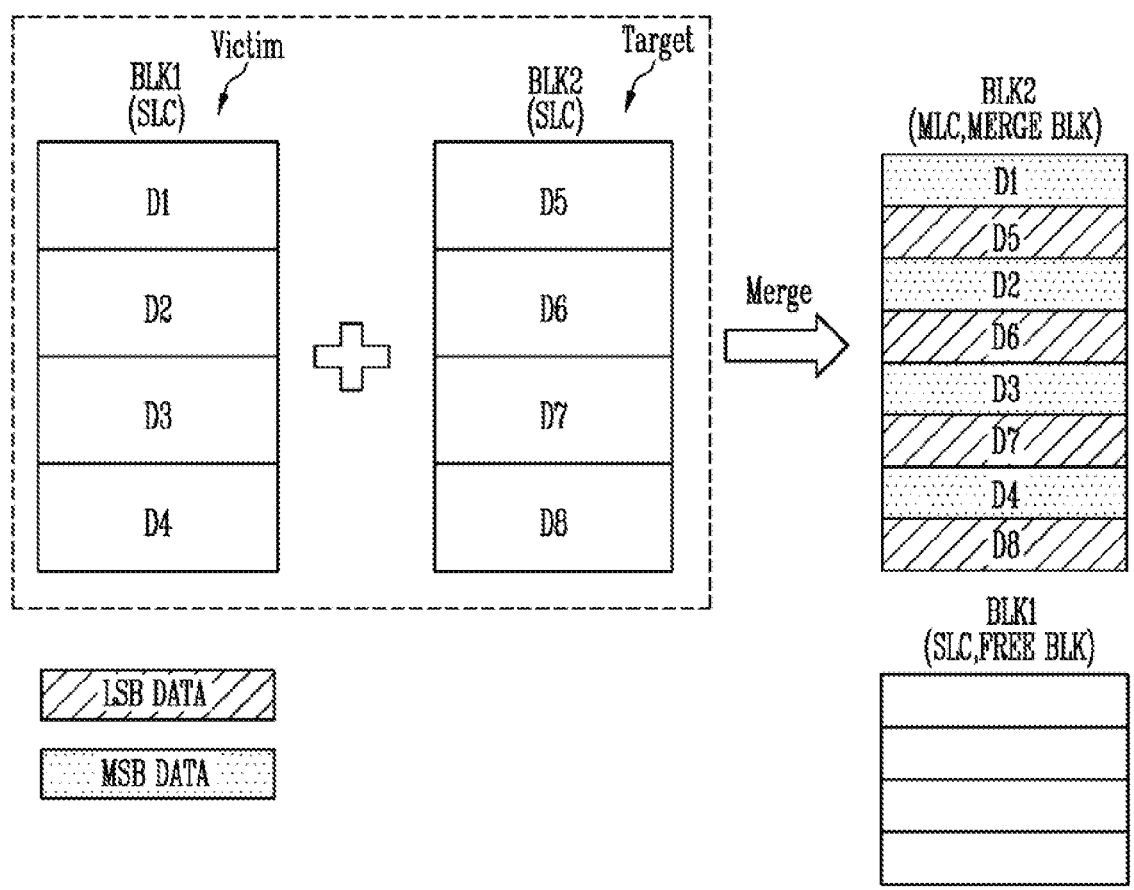
FIG. 4 is a diagram for describing a block merge operation in accordance with an embodiment.

FIG. 4 is a diagram for describing a block merge operation in accordance with an embodiment.

Referring to FIG. 4, a first block BLK1 and a second block BLK2 may be normal blocks of the first storage area described with reference to FIG. 1. Description will be made on the assumption that the normal blocks of the first storage area are SLC blocks including signal level cells each of which is capable of storing 1-bit data. The number of data bits capable of being stored in each memory cell included in the normal blocks is not limited to that of the present embodiment.

The first block BLK1 and the second block BLK2 may be data blocks that store valid data.

The first block BLK1 may store first to fourth data chunks D1 to D4. The second block BLK2 may store fifth to eighth data chunks D5 to D8.

In FIG. 4, the first block BLK1 may be a victim block, and the second block BLK2 may be a target block. A block merge operation of programming data stored in the first block BLK1 to the second block BLK2 may be performed.

The second block BLK2 may merge the first to fourth data chunks D1 to D4 stored in the first block BLK1 with the fifth to eighth data chunks D5 to D8 in an MLC program scheme, and then store the merged data.

For example, the first to fourth data chunks D1 to D4 stored in the first block BLK1 may be programmed to the second block BLK2 as most significant bit (MSB) data. The fifth to eighth data chunks D5 to D8 that have been stored in the second block BLK2 may be programmed as least significant bit (LSB) data. The MLC program scheme will be described with reference to FIG. 5.

The second block BLK2 may be changed from a normal block to a merge block by the block merge operation. The merge block may be a memory block which store data obtained by merging data stored in two normal blocks.

The first block BLK1 may be changed from a data block to a free block. The free block may be erased to store new data.

Due to the block merge operation, e.g., one normal block BLK1 of the two normal block BLK1 and BLK2 that store valid data may be secured as a free block. The other normal block BLK2 of the two normal blocks BLK1 and BLK2 may be changed to a merge block.

Figure 5:
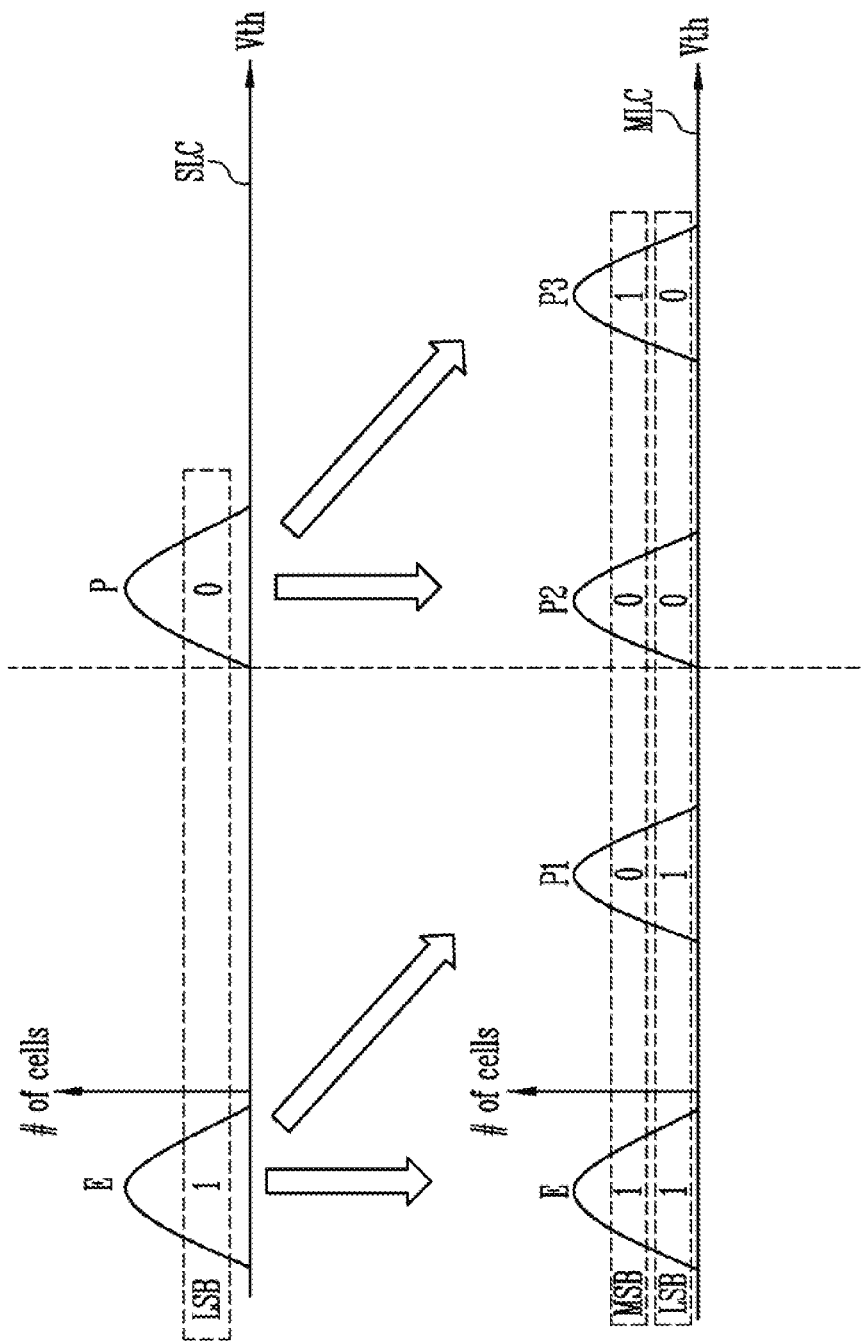
FIG. 5 is a diagram for describing a multi-level cell (MLC) program scheme of FIG. 4.

FIG. 5 is a diagram for describing the multi-level cell (MLC) program scheme of FIG. 4.

Referring to FIG. 5, a single-level cell (SLC) may be programmed to have any one state of an erased state E and a programmed state P. The SLC may store 1-bit data corresponding to each state. For example, data corresponding to the erased state E may be '1', and data corresponding to the programmed state P may be '0'. Data corresponding to each state is not limited to that of the present embodiment.

A multi-level cell (MLC) may be programmed to have any one state among the erased state E and a plurality of programmed states P1, P2, and P3. The MLC may store 2-bit data corresponding to each state. Data corresponding to the erased state E may be '11'. Data corresponding to the first programmed state P1 may be '01'. Data corresponding to the second programmed state P2 may be '00'. Data corresponding to the third programmed state P3 may be '10'. Data corresponding to each state is not limited to that of the present embodiment.

Data stored in a victim block may be programmed to a target block according to the block merge operation of FIG. 4. Here, the data stored in the victim block may be programmed to the target block as most significant bit (MSB) data. Data that has been previously stored in the target block may be programmed to the target block as least significant bit (LSB) data.

Therefore, memory cells having the erased state E as SLCs may be programmed to have the erased state E or the first programmed state P1 as MLCs according to the MSB data. Memory cells having the programmed state P as SLCs may be programmed to have the second programmed state P2 or the third programmed state P3 as MLCs according to the MSB data.

The program scheme according to the block merge operation is not limited to that of the present embodiment. In various embodiments, data stored in a first memory block of two memory blocks including n-bit level cells (n is a natural number of 1 or more) may be merged into and programmed to a second memory block of the two memory blocks. Here, the second memory block may be programmed in a 2n-bit level cell program scheme.

For example, data stored in any one MLC block of two MLC blocks may be programmed to the other MLC block in a quad level cell program scheme.

Figure 6:
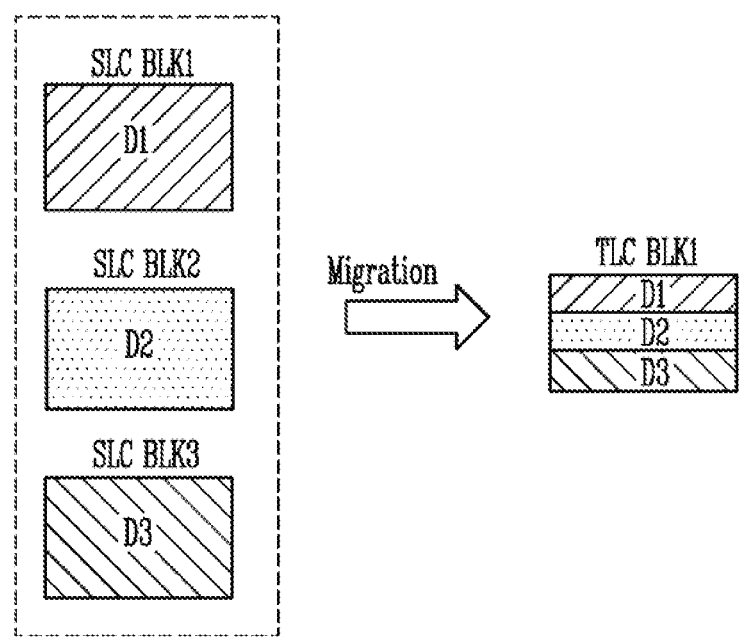
FIG. 6 is a diagram for describing a data migration operation in accordance with an embodiment of the present disclosure.

FIG. 6 is a diagram for describing a data migration operation in accordance with an embodiment of the present disclosure.

Referring to FIG. 6, the data migration operation may be an operation of migrating data stored in the first blocks of the first storage area described with reference to FIG. 1 to the second blocks of the second storage area.

The first blocks may be buffer blocks for temporarily storing data. The second blocks may be main blocks for storing data. The number of data bits capable of being stored in a memory cell of a main block may be greater than that of a memory cell of a buffer block. Therefore, the buffer block may be higher in program or read operation speed than the main block. The main block may store a larger amount of data than the buffer block. To rapidly perform the program operation, data input from the host may be first stored in the buffer block, and the data stored in the buffer block may be thereafter migrated to the main block.

In FIG. 6, each of first blocks may be an SLC block including a single-level cell. A second block may be a TLC block including a triple level cell. The number of data bits capable of being stored in a memory cell of the first block and the number of data bits capable of being stored in a memory cell of the second block are not limited to those of the present embodiment.

The data chunks D1 to D3 stored in the first blocks SLC BLK1 to SLC BLK3 may be copied to the second block TLC BLK1. Thereafter, the first blocks SLC BLK1 to SLC BLK3 may be changed from data blocks to free blocks. The first blocks SLC BLK1 to SLC BLK3 may be erased before new data are stored therein.

The data migration operation may be an operation of copying data stored in at least two or more buffer blocks to a main block. For example, the data migration operation may be an operation of reading data stored in at least two or more buffer blocks, and storing the read data to the main block.

The block merge operation described with reference to FIG. 4 may be an operation of merging data stored in a first normal block of two normal blocks into a second normal block of the two normal blocks, and thus storing the merged data in the second normal block. For example, the block merge operation may be an operation of reading data stored in one normal block, and storing the read data in the other normal block.

Therefore, since the numbers of read operations and program operations that are performed for the block merge operation are less than that of the data migration operation, the speed of the block merge operation is greater than that of the data migration operation. The block merge operation may secure one free block, and the data migration operation may secure at least two or more free blocks.

Figure 7:
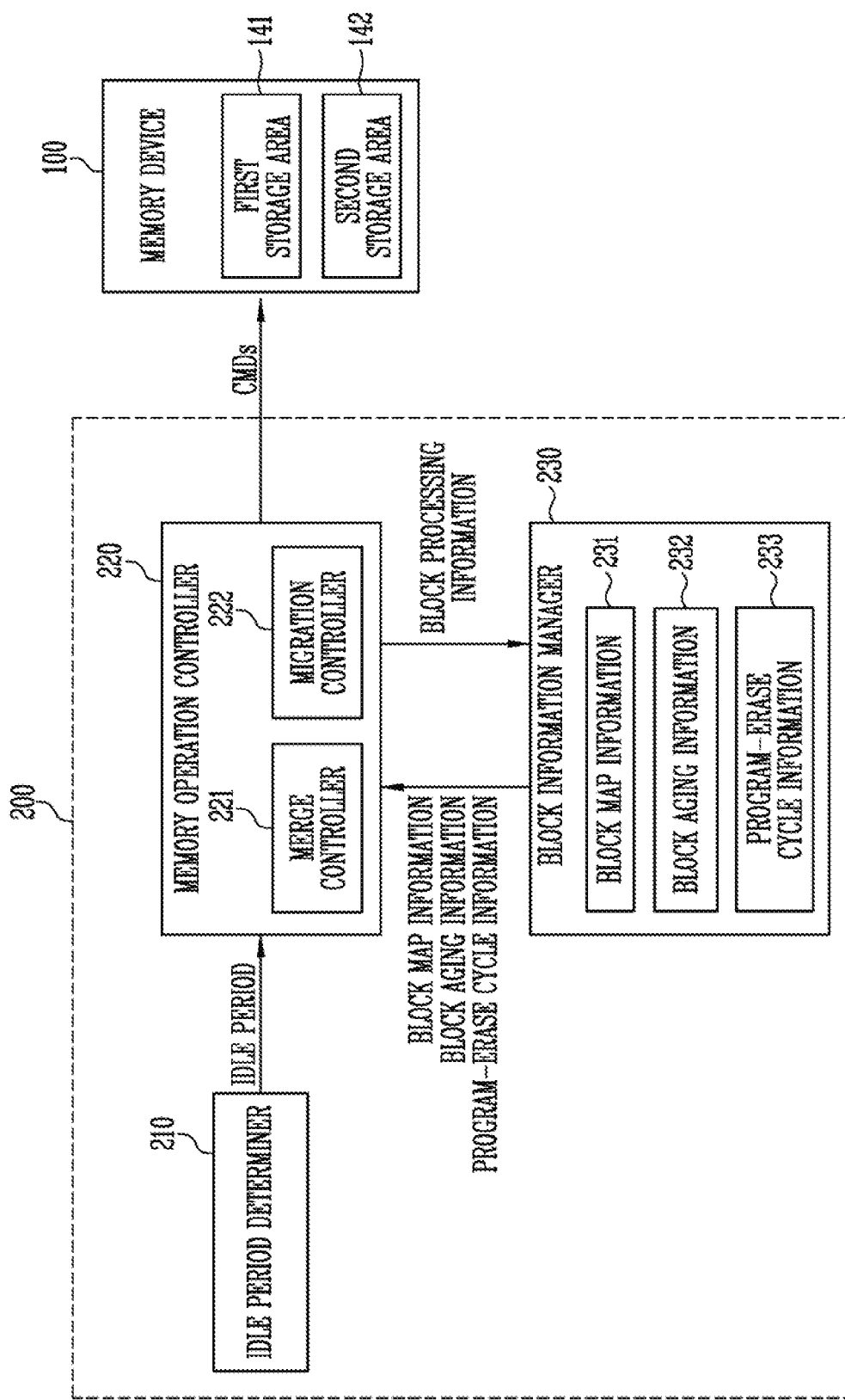
FIG. 7 is a diagram illustrating the configuration and operation of a memory controller in accordance with an embodiment of the present disclosure.

FIG. 7 is a diagram illustrating the configuration and operation of the memory controller in accordance with an embodiment of the present disclosure.

Referring to FIG. 7, the memory device 100 may include a first storage area 141 and a second storage area 142. The first storage area 141 may include a predetermined number of first blocks. The second storage area 142 may include second blocks.

In an embodiment, each of the first blocks may be a normal block or a merge block. The merge block may be a block configured to store merge data by a block merge operation.

In an embodiment, the normal blocks of the first blocks may include memory cells each of which is capable of storing n bits (n is a natural number of 1 or more). The second blocks may include memory cells each of which is capable of storing m bits (m is a natural number greater than n).

In an embodiment, each of the first blocks may be a data block or a free block. The data block may be a block which stores valid data. The free block may be a block which does not store valid data.

In an embodiment, the memory controller 200 may include an idle period determiner 210, a memory operation controller 220, and a block information manager 230.

The idle period determiner 210 may predict an idle period of the memory device 100 based on a state of the memory device 100. The idle period may be a period in which the memory device 100 that has completed an operation corresponding to a preceding input request from the host does not an operation until a new request is input from the host to the memory device 100.

The idle period determiner 210 may predict a current idle period based on previous idle periods of the memory device 100.

In an embodiment, the idle period determiner 210 may select a preset number of latest idle period values among previous idle period values. The idle period determiner 210 may compensate for the selected idle period values using a compensation coefficient. The idle period determiner 210 may use a sum, an average, a median value, a minimum value, or a maximum value of the compensated idle period values to predict the value of a current idle period. The word "preset" as used herein with respect to a parameter, such as a preset number, means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm.

The idle period determiner 210 may provide information about the predicted idle period to a merge controller 221 and a migration controller 222.

The memory operation controller 220 may include the merge controller 221 and the migration controller 222. The memory operation controller 220 may provide, to the block information manager 230, block processing information indicating a result of processing the blocks of the first storage area 141 according to a block merge operation or a data migration operation.

In an embodiment, the merge controller 221 may control the memory device 100 to perform a block merge operation.

For example, the merge controller 221 may select a victim block and a target block from among normal blocks of the first storage area 141. The merge controller 221 may select a victim block and a target block during the block merge operation based on block aging information 232 or program-erase cycle information 233 that is provided from the block information manager 230.

In an embodiment, the merge controller 221 may select as a target block a normal block, a final program elapsed time of which is shorter than that of a victim block or a program-erase cycle of which is higher than that of the victim block, among the normal blocks of the first storage area 141.

The merge controller 221 may control the memory device 100 to program data stored in the victim block to the target block. The merge controller 221 may provide a command for reading data stored in the victim block to the memory device 100. The merge controller 221 may provide, to the memory device 100, a command of programming the read data to the target block. The target block on which the block merge operation has been performed may be changed from a normal block to a merge block. After the block merge operation has been performed, the victim block may be changed from a data block to a free block. The victim block may be erased before new data is stored therein.

In an embodiment, the migration controller 222 may control the memory device 100 to perform a data migration operation. The data migration operation may be an operation of migrating data stored in blocks of the first storage area 141 to blocks of the second storage area 142.

For example, the migration controller 222 may control the memory device 100 to copy data stored in at least two or more blocks of the first storage area 141 to a block of the second storage area 142. In various embodiments, the at least two or more blocks may include not only normal blocks but also merge blocks.

The migration controller 222 may provide, to the memory device 100, a command for reading data stored in the at least two or more blocks. The migration controller 222 may provide, to the memory device 100, a command for programming the read data to the block of the second storage area 142. After the data migration operation has been performed, at least two or more blocks may be changed from data blocks to free blocks. The at least two or more blocks may be erased before new data is stored therein.

In an embodiment, the merge controller 221 may control the memory device 100 to perform a block merge operation based on a result of comparison between an idle period predicted by the idle period determiner 210 and a plurality of threshold values.

For example, the merge controller 221 may control the memory device 100 to perform a block merge operation if the predicted idle period is equal to or greater than the first threshold value. The merge controller 221 may control the memory device 100 to perform a block merge operation if the predicted idle period is equal to or greater than the first threshold value and less than the second threshold value.

In an embodiment, the migration controller 222 may control the memory device 100 to perform a data migration operation based on a result of comparison between the idle period predicted by the idle period determiner 210 and the second threshold value. For example, the migration controller 222 may control the memory device 100 to perform the data migration operation if the predicted idle period is equal to or greater than the second threshold value.

In an embodiment, the merge controller 221 may control the memory device 100 to perform a block merge operation based on block map information 231. The block map information 231 may indicate the number of free blocks included in the first storage area 141.

For example, the merge controller 221 may control the memory device 100 to perform a block merge operation if the number of free blocks included in the first storage area 141 is equal to or less than the second threshold number. Alternatively, the merge controller 221 may control the memory device 100 to perform a block merge operation if the number of free blocks included in the first storage area 141 is greater than the first threshold number and equal to or less than the second threshold number.

In an embodiment, the migration controller 222 may control the memory device 100 to perform a data migration operation based on the block map information 231 provided from the block information manager 230. The block map information 231 may indicate the number of free blocks included in the first storage area 141. The block map information 231 may indicate the number of merge blocks included in the first storage area 141.

For example, the migration controller 222 may control the memory device 100 to perform a data migration operation if the number of free blocks included in the first storage area 141 is equal to or less than the first threshold number. The migration controller 222 may control the memory device 100 to perform a data migration operation if the number of merge blocks included in the first storage area 141 is equal to or greater than the reference number.

In an embodiment, the block information manager 230 may store information about the blocks of the first storage area 141. The block information manager 230 may update information about the blocks of the first storage area 141 based on the block processing information.

The block information manager 230 may store block map information. The block map information may indicate whether each of the blocks of the first storage area 141 is a normal block or a merge block. The block map information may indicate whether each of the blocks of the first storage area 141 is a data block or a free block. In an embodiment, changing a target block from a normal block to a merge block includes changing the stored block map information to indicate that the target block is now a merge block.

The block information manager 230 may store block aging information. The block aging information may indicate a final program elapsed time that is the time elapsed after a last program operation of each of normal blocks of the first storage area 141 has been performed.

The block information manager 230 may store program-erase cycle information. The block aging information may indicate a program-erase cycle of each of the normal blocks of the first storage area 141.

The block information manager 230 may provide the block map information, the block aging information, and the program-erase cycle information to the merge controller 221. The block information manager 230 may provide the block map information to the migration controller 222.

Figure 8:
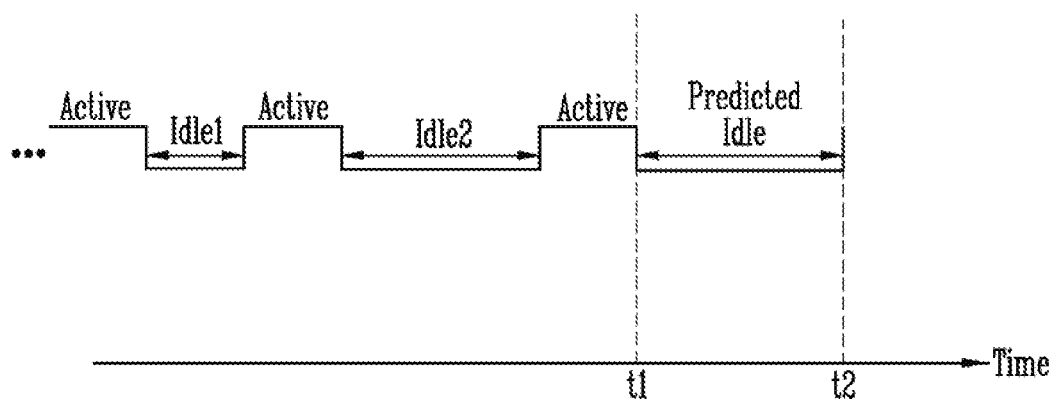
FIG. 8 is a diagram for describing an idle period of the memory device in accordance with an embodiment.

FIG. 8 is a diagram for describing an idle period of the memory device in accordance with an embodiment.

Referring to FIG. 8, the memory device may have an active state or an idle state.

The active state may be a state in which the memory device is performing an operation in response to a request from the host. The idle state may be a state in which the memory device does not perform an operation corresponding to a request from the host. The memory device may perform, when in the idle state, an internal operation unrelated to a request from the host.

An idle period in which the memory device is in the idle state may be predicted based on the state of the memory device. For example, a current idle period of the memory device may be predicted based on information about preceding idle periods of the memory device.

An idle period at time t1 (current time) may be predicted based on a plurality of idle periods Idle1 and Idle2 prior to time t1. The number of idle periods prior to time t1 is not limited to that of the present embodiment.

In various embodiments, a preset number of latest idle periods may be selected from among a plurality of idle periods prior to time t1. The reason why a preset number of latest idle periods are selected is to reduce importance of old idle periods and increase importance of recent idle periods in predicting the current idle period. In this way, an idle period that reflects a recent state of the memory device may be predicted.

Compensated idle period values obtained by reflecting a compensation coefficient in the selected idle period values may be calculated. The compensation coefficient may be changed by idle periods. A current idle period value may be predicted based on a sum, an average, a median value, a maximum value, or a minimum value of the compensated idle period values.

For example, two latest idle periods may be selected from among the idle periods prior to time t1. The value of the first idle period Idle1 may be multiplied by a first compensation coefficient. The value of the second idle period Idle2 may be multiplied by a second compensation coefficient. The second compensation coefficient may differ from the first compensation coefficient. The second compensation coefficient may be greater than the first compensation coefficient.

When it is assumed that the first compensation coefficient is 0.4 and the second compensation coefficient is 0.6, the value of the predicted current idle period Predicted Idle may be the sum of a compensated first idle period value and a compensated second idle period value.

In an embodiment, if the value of the predicted idle period Predicted Idle is greater than the first threshold value, a block merge operation may be performed. If the value of the predicted idle period Predicted Idle is greater than the second threshold value, a data migration operation may be performed. The second threshold value may be greater than the first threshold value. In an embodiment, the second threshold value may be less than the first threshold value.

Figure 9:
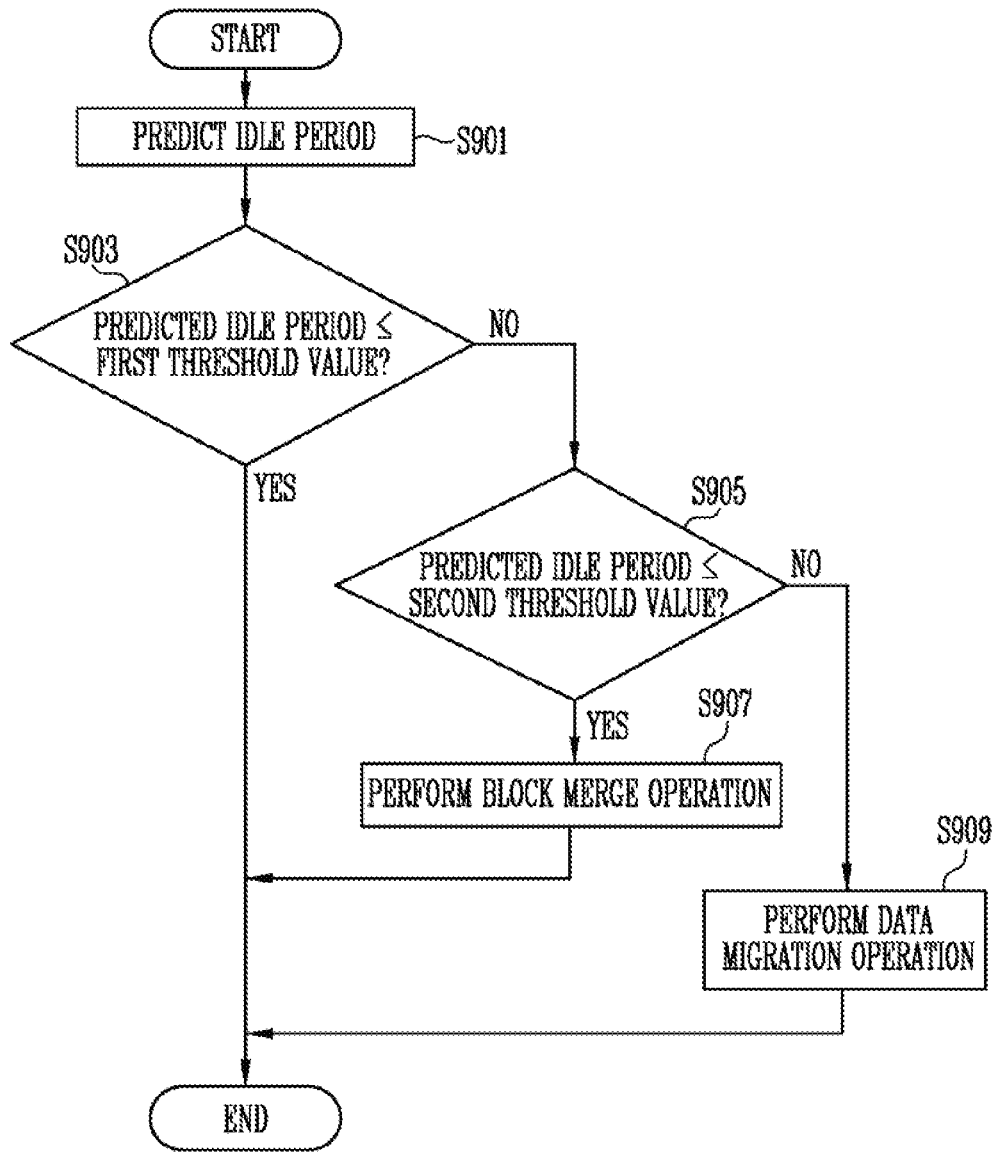
FIG. 9 is a flowchart for describing an operation of the storage device in accordance with an embodiment.

FIG. 9 is a flowchart for describing an operation of the storage device in accordance with an embodiment.

Referring to FIG. 9, the first threshold value may be a minimum value of an idle period that triggers a block merge operation. The second threshold value may be a minimum value of an idle period that triggers a data migration operation. In FIG. 9, the second threshold value may be greater than the first threshold value. In an embodiment, the second threshold value may be less than the first threshold value.

At step S901, the storage device may predict an idle period of the memory device. For example, the storage device may predict a value of an idle period at a current time based on values of a plurality of idle periods prior to the current time.

At step S903, the storage device may determine whether or not the value of the predicted idle period is less than or equal to the first threshold value. As a result of the determination, if the value of the idle period is less than or equal to the first threshold value, the storage device terminates the operation. If the value of the predicted idle period is greater than the first threshold value, the storage device proceeds to step S905.

At step S903, the storage device may determine whether or not the value of the predicted idle period is less than or equal to the second threshold value. As a result of the determination, if the value of the idle period is less than or equal to the second threshold value, the storage device proceeds to step S907. If the value of the predicted idle period is greater than the second threshold value, the storage device proceeds to step S909.

At step S907, the storage device may perform a block merge operation. Although the block merge operation is less in the number of free blocks secured in the first storage area than the data migration operation, the speed of performing the block merge operation may be higher than that of the data migration operation.

At step S909, the storage device may perform the data migration operation. Although the data migration operation is slower than the block merge operation, the number of free blocks that are secured in the first storage area through the data migration operation may be greater than that of the block merge operation.

Figure 10:
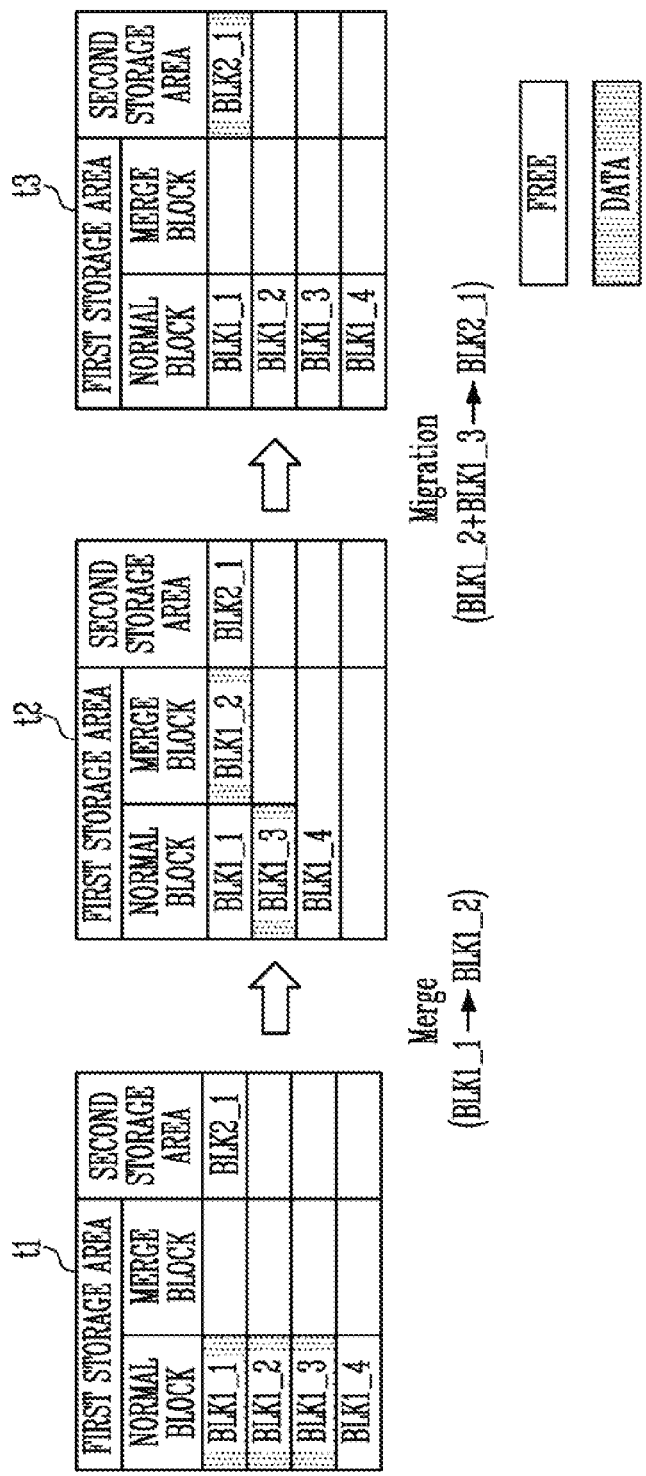
FIG. 10 is a diagram for describing block map information of FIG. 7.

FIG. 10 is a diagram for describing block map information of FIG. 7.

Referring to FIG. 10, the block map information may indicate information about the first blocks of the first storage area described with reference to FIG. 7. The block map information may indicate information about the second blocks of the second storage area as this is shown in FIG. 10 as well.

The block map information may indicate whether each of the blocks of the first storage area is a normal block or a merge block. The block map information may indicate whether each of the blocks of the first storage area is a data block or a free block.

The block map information may be updated based on the block processing information described with reference to FIG. 7.

In FIG. 10, blocks BLK1_1 to BLK1_4 may be first blocks included in the first storage area. A block BLK2_1 may be a second block included in the second storage area.

The description will be made on the assumption that each of the normal blocks of the first storage area is an SLC block and the block of the second storage area is a TLC block. The number of data bits capable of being stored in a memory cell of each block is not limited to that of the present embodiment.

For example, at time t1, all of the blocks BLK1_1 to BLK1_4 may be normal blocks. The blocks BLK1_1 to BLK1_3 may be data blocks which store valid data. The blocks BLK1_4 and BLK2_1 may be free blocks which do not store valid data.

Time t2 may be after the block merger operation is performed at time t1. During the block merger operation, the block BLK1_1 among the normal blocks of the first storage area may be selected as a victim block, and the block BLK1_2 may be selected as a target block. Data stored in the block BLK1_1 may be programmed to the block BLK1_2.

The block BLK1_2 that is a target block may be changed from a normal block to a merge block after the block merge operation has been performed. The block BLK1_1 that is a victim block may be changed from a data block to a free block after the block merge operation has been performed.

Time t3 may be after a data migration operation is performed at time t2. During the data migration operation, data stored in at least two or more blocks among the blocks of the first storage area may be copied to blocks of the second storage area. The at least two or more blocks may include not only normal blocks but also merge blocks.

For example, data stored in the block BLK1_3 that is a normal block of the first storage area and data stored in the block BLK1_2 that is a merge block of the first storage area may be copied to the block BLK2_1 of the second storage area.

After the data migration operation has been performed, the at least two or more blocks BLK1_2 and BLK1_3 may be changed from data blocks to free blocks.

Figure 11A:
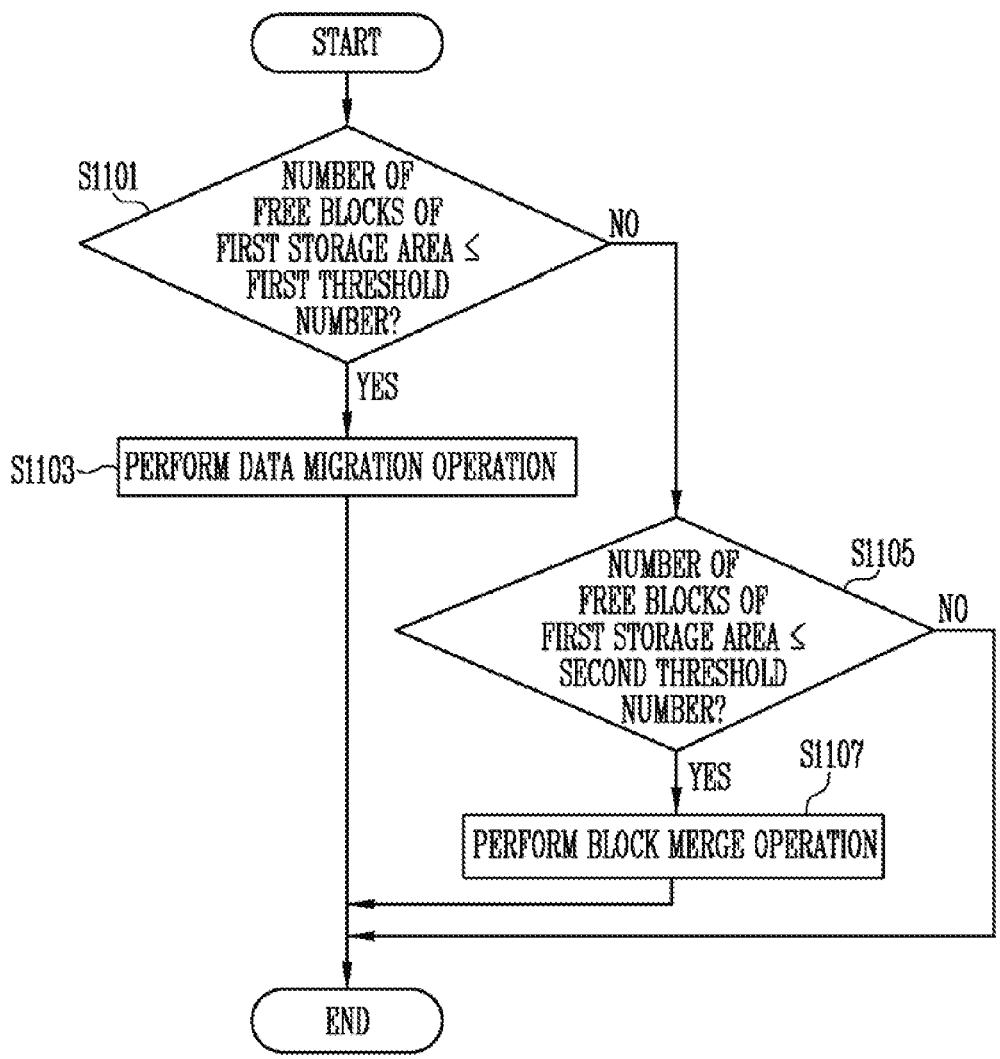
FIG. 11A is a flowchart for describing an operation of the storage device in accordance with an embodiment.

FIG. 11A is a flowchart for describing an operation of the storage device in accordance with an embodiment.

Referring to FIG. 11A, the first threshold number may be a minimum number of free blocks that triggers a data migration operation. The second threshold number may be a minimum number of free blocks that triggers a block merge operation. In FIG. 11A, the second threshold number may be greater than the first threshold number. In an embodiment, the second threshold number may be less than the first threshold number.

At step S1101, the storage device may determine whether or not the number of free blocks of the first storage area is less than or equal to the first threshold number. As a result of the determination, if the number of free blocks of the first storage area is less than or equal to the first threshold number, the storage device proceeds to step S1103. If the number of free blocks of the first storage area is greater than the first threshold number, the storage device proceeds to step S1105.

At step S1103, the storage device may perform a data migration operation. If the number of free blocks of the first storage area is less than the first threshold number, the storage device may perform the data migration operation that is able to secure an increased number of free blocks compared to that of a block merge operation although the data migration operation takes longer time than the block merge operation.

At step S1105, the storage device may determine whether or not the number of free blocks of the first storage area is less than or equal to the second threshold number. As a result of the determination, if the number of free blocks of the first storage area is less than or equal to the second threshold number, the storage device proceeds to step S1107. If the number of free blocks of the first storage area is greater than the second threshold number, the storage device terminates the operation.

At step S1107, the storage device may perform a block merge operation. If the number of free blocks of the first storage area is greater than the first threshold number and less than or equal to the second threshold number, the storage device may perform the block merge operation that takes shorter time than the data migration operation although the number of free blocks secured by the block merge operation is less than that of the data migration operation.

Figure 11B:
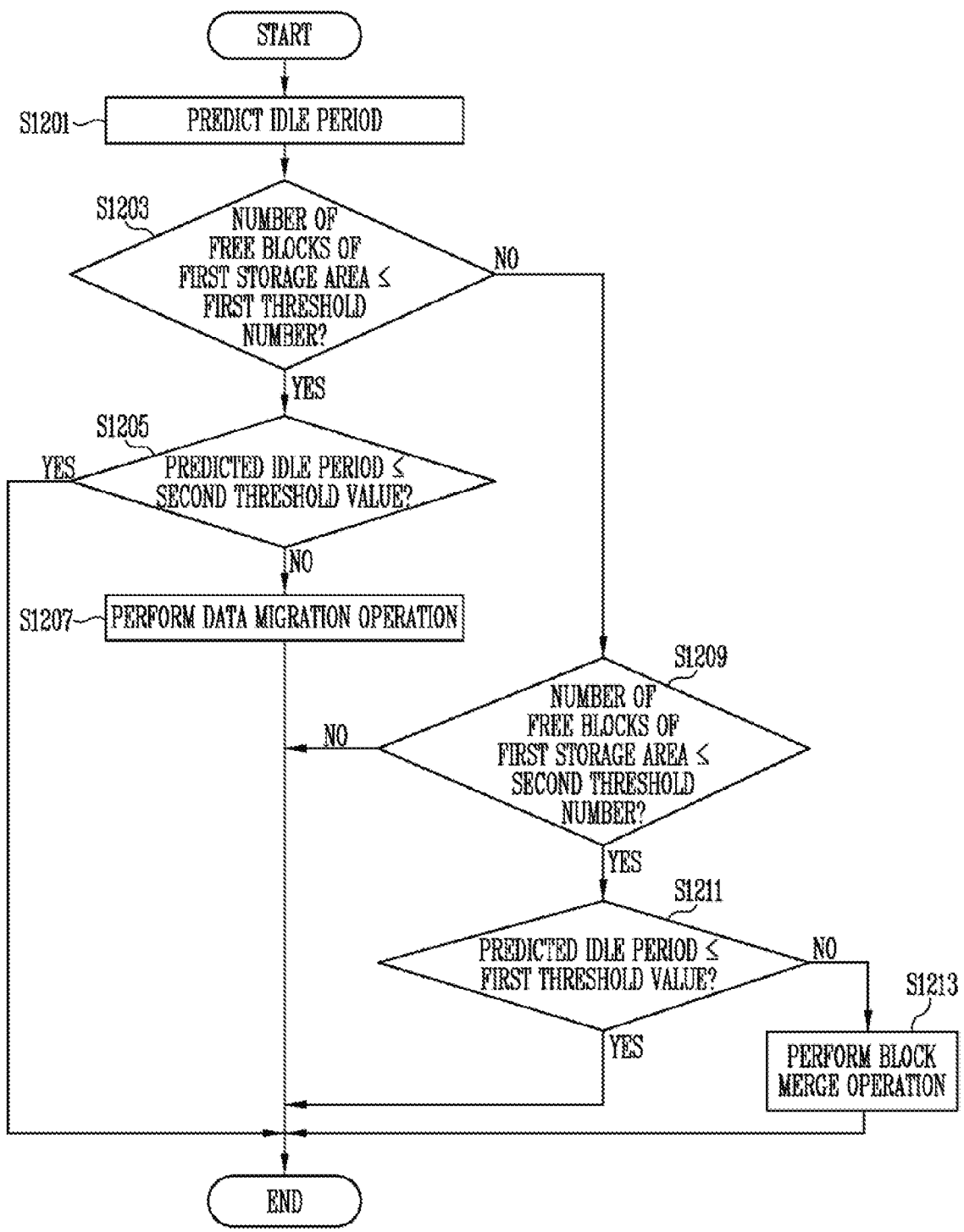
FIG. 11B is a flowchart for describing an operation of the storage device in accordance with an embodiment.

FIG. 11B is a flowchart for describing an operation of the storage device in accordance with an embodiment.

Referring to FIG. 11B, at step S1201, the storage device may predict an idle period of the memory device. For example, the storage device may predict a value of an idle period at a current time based on values of a plurality of idle periods prior to the current time.

At step S1203, the storage device may determine whether or not the number of free blocks of the first storage area is less than or equal to the first threshold number. As a result of the determination, if the number of free blocks of the first storage area is less than or equal to the first threshold number, the storage device proceeds to step S1205. If the number of free blocks of the first storage area is greater than the first threshold number, the storage device proceeds to step S1209.

At step S1205, the storage device may determine whether or not the value of the predicted idle period is less than or equal to the second threshold value. As a result of the determination, if the value of the idle period is less than or equal to the second threshold value, the storage device terminates the operation. If the value of the predicted idle period is greater than the second threshold value, the storage device proceeds to step S1207.

At step S1207, the storage device may perform a data migration operation. If the number of free blocks of the first storage area is less than the first threshold number, the storage device may perform the data migration operation that is able to secure an increased number of free blocks compared to that of a block merge operation although the data migration operation takes longer time than the block merge operation.

At step S1209, the storage device may determine whether or not the number of free blocks of the first storage area is less than or equal to the second threshold number. As a result of the determination, if the number of free blocks of the first storage area is less than or equal to the second threshold number, the storage device proceeds to step S1211. If the number of free blocks of the first storage area is greater than the second threshold number, the storage device terminates the operation.

At step S1211, the storage device may determine whether or not the value of the predicted idle period is less than or equal to the first threshold value. As a result of the determination, if the value of the idle period is less than or equal to the first threshold value, the storage device terminates the operation. If the value of the predicted idle period is greater than the first threshold value, the storage device proceeds to step S1213.

At step S1213, the storage device may perform a block merge operation. If the number of free blocks of the first storage area is greater than the first threshold number and less than or equal to the second threshold number, the storage device may perform the block merge operation that takes shorter time than the data migration operation although the number of free blocks secured by the block merge operation is less than that of the data migration operation.

Figure 12A:
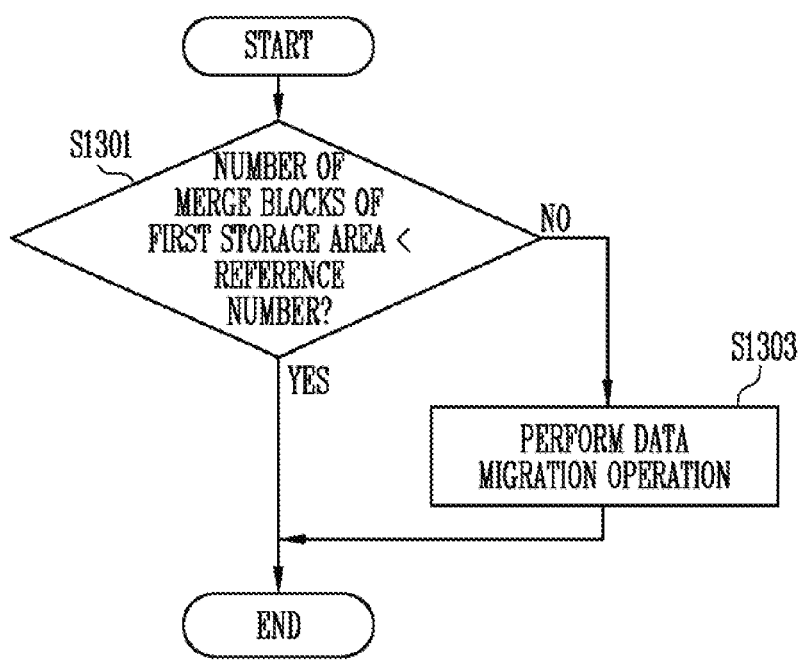
FIG. 12A is a flowchart for describing an operation of the storage device in accordance with an embodiment.

FIG. 12A is a flowchart for describing an operation of the storage device in accordance with an embodiment.

Referring to FIG. 12A, the reference number may be a minimum number of merge blocks that triggers a data migration operation.

At step S1301, the storage device may determine whether the number of merge blocks of the first storage area is less than the reference number. As a result of the determination, the storage device may terminate the operation if the number of merge blocks of the first storage area is less than the reference number. If the number of merge blocks of the first storage area is greater than or equal to the reference number, the storage device proceeds to step S1303.

At step S1303, the storage device may perform a data migration operation. If the data migration operation is performed, the number of merge blocks of the first storage area may be reduced.

Figure 12B:
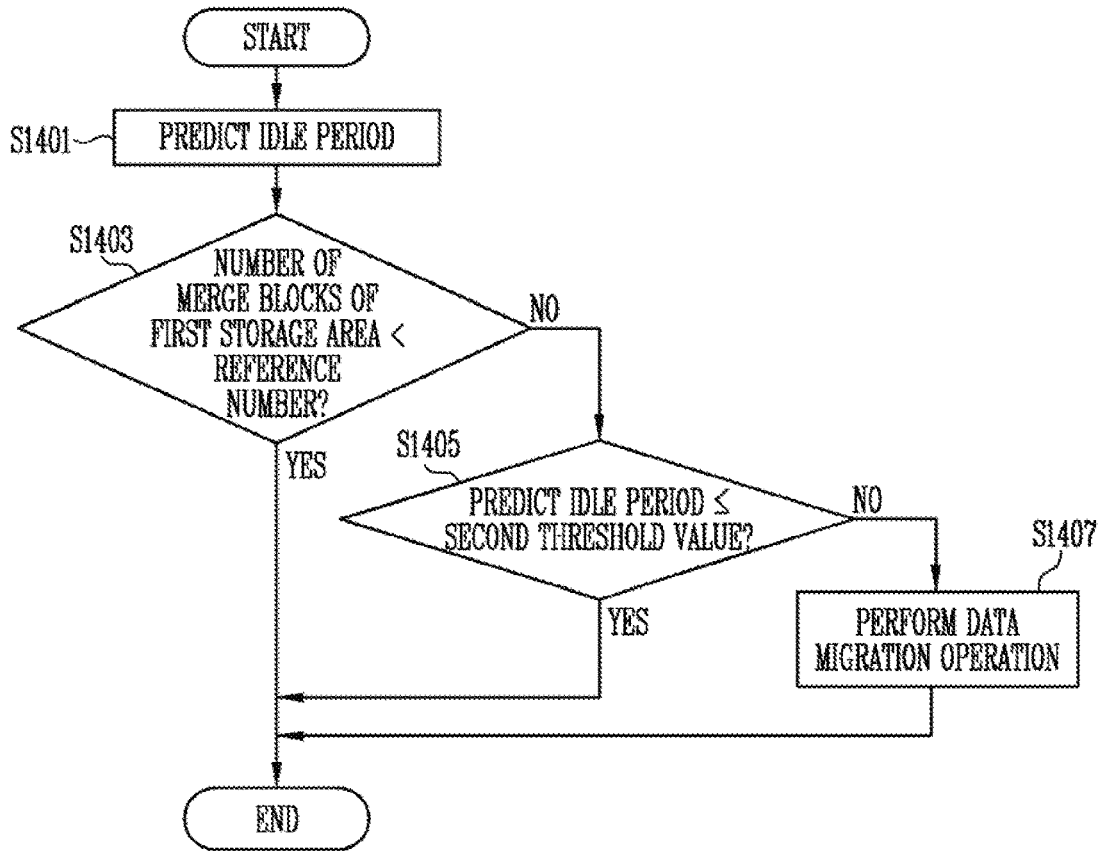
FIG. 12B is a flowchart for describing an operation of the storage device in accordance with an embodiment.

FIG. 12B is a flowchart for describing an operation of the storage device in accordance with an embodiment.

Referring to FIG. 12B, at step S1401, the storage device may predict an idle period of the memory device. For example, the storage device may predict a value of an idle period at a current time based on values of a plurality of idle periods prior to the current time.

At step S1403, the storage device may determine whether the number of merge blocks of the first storage area is less than the reference number. As a result of the determination, the storage device may terminate the operation if the number of merge blocks of the first storage area is less than the reference number. If the number of merge blocks of the first storage area is greater than or equal to the reference number, the storage device proceeds to step S1405.

At step S1405, the storage device may determine whether or not the value of the predicted idle period is less than or equal to the second threshold value. As a result of the determination, if the value of the idle period is less than or equal to the second threshold value, the storage device terminates the operation. If the value of the predicted idle period is greater than the second threshold value, the storage device proceeds to step S1407.

At step S1407, the storage device may perform a data migration operation. If the data migration operation is performed, the number of merge blocks of the first storage area may be reduced.

Figure 13:
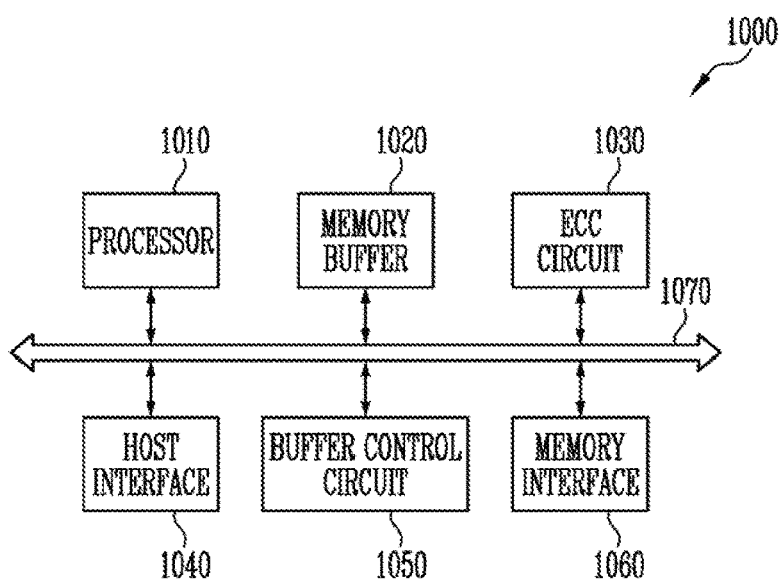
FIG. 13 is a diagram illustrating an embodiment of a memory controller of FIG. 1.

FIG. 13 is a diagram illustrating an embodiment of the memory controller of FIG. 1.

Referring to FIG. 13, a memory controller 1000 is coupled to a host and a memory device. In response to a request from the host, the memory controller 1000 may access the memory device. For example, the memory controller 1000 may control a write operation, a read operation, an erase operation, and a background operation of the memory device. The memory controller 1000 may provide an interface between the memory device and the host. The memory controller 1000 may drive firmware for controlling the memory device.

The memory controller 1000 may include a processor 1010, a memory buffer 1020, an error correction code (ECC) circuit 1030, a host Interface 1040, a buffer control circuit 1050, a memory interface 1060, and a bus 1070.

The bus 1070 may provide a channel between the components of the memory controller 1000.

The processor 1010 may control the overall operation of the memory controller 1000 and perform a logical operation. The processor 1010 may communicate with the external host through the host interface 1040, and communicate with the memory device through the memory interface 1060. In addition, the processor 1010 may communicate with the memory buffer 1020 through the buffer control circuit 1050. The processor 1010 may control the operation of the storage device by using the memory buffer 1020 as an operating memory, a cache memory, or a buffer memory.

The processor 1010 may perform the function of a flash translation layer (FTL). The processor 1010 may translate a logical block address (LBA), provided by the host, into a physical block address (PBA) through the FTL. The FTL may receive the LBA and translate the LBA into the PBA using a mapping table. An address mapping method using the FTL may be modified in various ways depending on the unit of mapping. Representative address mapping methods may include a page mapping method, a block mapping method, and a hybrid mapping method.

The processor 1010 may randomize data received from the host. For example, the processor 1010 may use a randomizing seed to randomize data received from the host.

Randomized data may be provided to the memory device as data to be stored, and may be programmed to the memory cell array.

During a read operation, the processor 1010 may derandomize data received from the memory device 100. For example, the processor 1010 may use a derandomizing seed to derandomize data received from the memory device. Derandomized data may be output to the host.

In an embodiment, the processor 1010 may drive software or firmware to perform the randomizing operation or the derandomizing operation.

The memory buffer 1020 may be used as an operating memory, a cache memory, or a buffer memory of the processor 1010. The memory buffer 1020 may store codes and commands to be executed by the processor 1010. The memory buffer 1020 may store data to be processed by the processor 1010. The memory buffer 1020 may include a static RAM (SRAM) or a dynamic RAM (DRAM).

The ECC circuit 1030 may perform error correction. The ECC circuit 1030 may perform an ECC encoding operation based on data to be written to the memory device through the memory interface 1060. ECC encoded data may be transmitted to the memory device through the memory interface 1060. The ECC circuit 1030 may perform an ECC decoding operation on data received from the memory device through the memory interface 1060. For example, the ECC circuit 1030 may be included in the memory interface 1060 as a component of the memory interface 1060.

The host interface 1040 may communicate with the external host under control of the processor 1010. The host interface 1040 may perform communication using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), multiMedia card (MMC), an embedded MMC (eMMC), a dual in-line memory module (DIMM), a registered DIMM (RDIMM), and a load reduced DIMM (LRDIMM) communication methods.

The buffer control circuit 1050 may control the memory buffer 1020 under control of the processor 1010.

The memory interface 1060 may communicate with the memory device 100 under control of the processor 1010. The memory interface 1060 may communicate a command, an address, and data with the memory device through the channel.

For example, the memory controller 1000 may include neither the memory buffer 1020 nor the buffer control circuit 1050.

For example, the processor 1010 may use codes to control the operation of the memory controller 1000. The processor 1010 may load codes from a nonvolatile memory device (e.g., a read only memory) provided in the memory controller 1000. Alternatively, the processor 1010 may load codes from the memory device through the memory interface 1060.

For example, the bus 1070 of the memory controller 1000 may be divided into a control bus and a data bus. The data bus may transmit data in the memory controller 1000. The control bus may transmit control information such as a command and an address in the memory controller 1000. The data bus and the control bus may be separated from each other and may neither interfere with each other nor affect each other. The data bus may be coupled to the host interface 1040, the buffer control circuit 1050, the ECC circuit 1030, and the memory interface 1060. The control bus may be coupled to the host interface 1040, the processor 1010, the buffer control circuit 1050, the memory buffer 1020, and the memory interface 1060.

Figure 14:
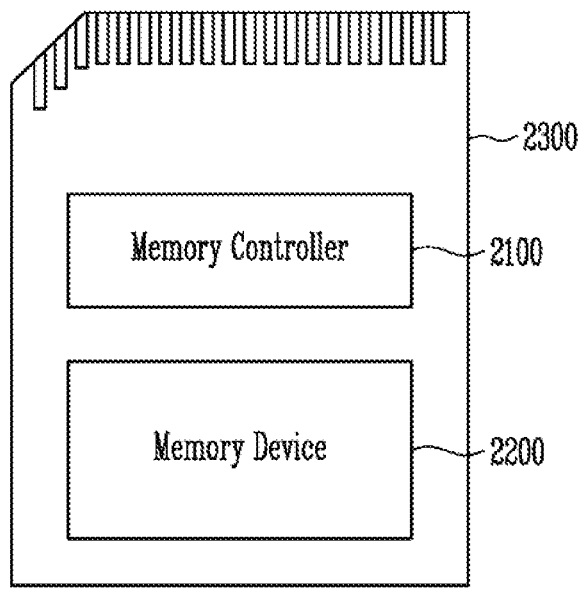
FIG. 14 is a block diagram illustrating a memory card system to which a storage device in accordance with an embodiment of the present disclosure is applied.

FIG. 14 is a block diagram illustrating a memory card system 2000 to which a storage device in accordance with an embodiment of the present disclosure is applied.

Referring FIG. 14, the memory card system 2000 may include a memory controller 2100, a memory device 2200 and a connector 2300.

The memory controller 2100 is coupled to the memory device 2200. The memory controller 2100 may access the memory device 2200. For example, the memory controller 2100 may control a read operation, a write operation, an erase operation, and a background operation of the memory device 2200. The memory controller 2100 may provide an interface between the memory device 2200 and the host. The memory controller 2100 may drive firmware for controlling the memory device 2200. The memory controller 2100 may be embodied in the same manner as that of the memory controller 200 described with reference to FIG. 1.

In an embodiment, the memory controller 2100 may include components such as a random access memory (RAM), a processing unit, a host interface, and a memory interface, and an ECC circuit.

The memory controller 2100 may communicate with an external device through the connector 2300. The memory controller 2100 may communicate with an external device (e.g., a host) based on a specific communication protocol. In an embodiment, the memory controller 2100 may communicate with the external device through at least one of various communication protocols such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), Wi-Fi, Bluetooth, and nonvolatile memory express (NVMe) protocols. In an embodiment, the connector 2300 may be defined by at least one of the above-described various communication protocols.

In an embodiment, the memory device 2200 may be implemented as any of various nonvolatile memory devices, such as an electrically erasable and programmable ROM (EEPROM), a NAND flash memory, a NOR flash memory, a phase-change RAM (PRAM), a resistive RAM (ReRAM), a ferroelectric RAM (FRAM), and a spin-torque magnetic RAM (STT-MRAM).

In an embodiment, the memory controller 2100 and the memory device 2200 may be integrated into a single semiconductor device to form a memory card. For example, the memory controller 2100 and the memory device 2200 may be integrated into a single semiconductor device to form a memory card such as a personal computer memory card international association (PCMCIA), a compact flash card (CF), a smart media card (SM or SMC), a memory stick, a multimedia card (MMC, RS-MMC, or MMCmicro), a SD card (SD, miniSD, microSD, or SDHC), or a universal flash storage (UFS).

Figure 15:
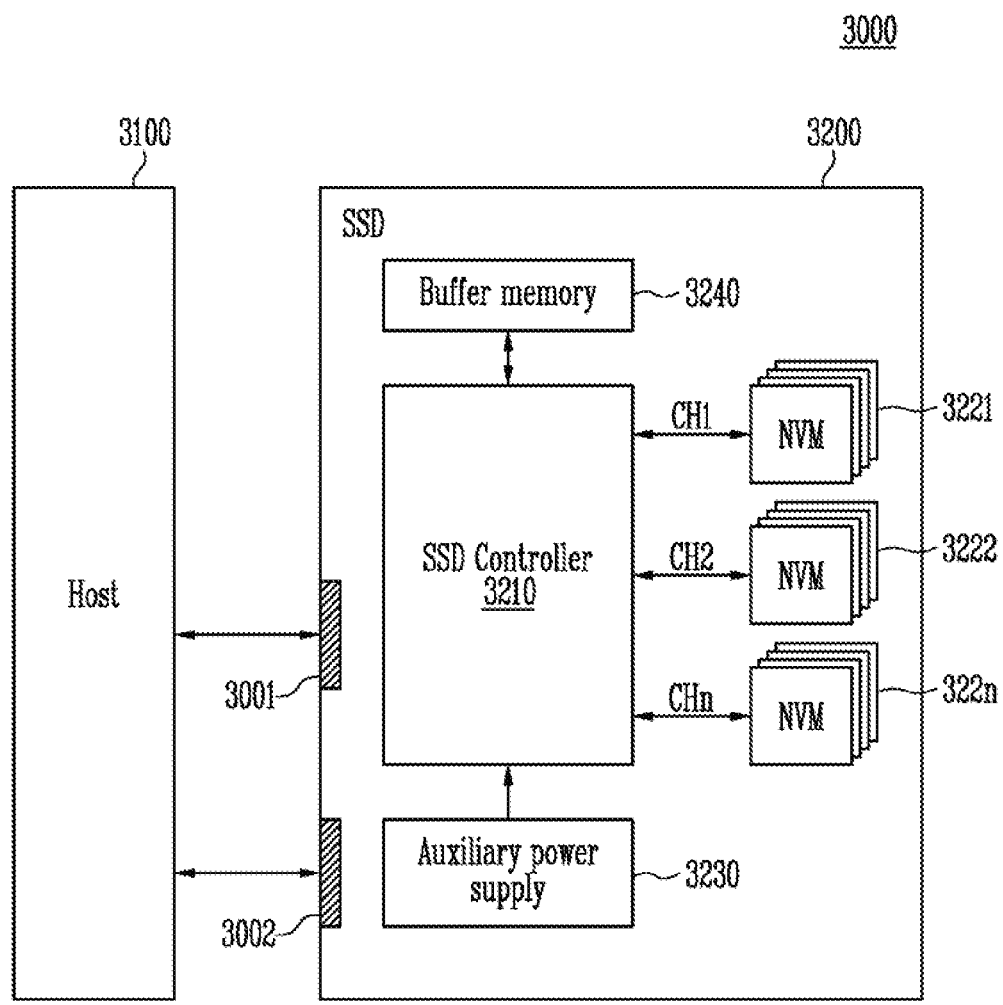
FIG. 15 is a block diagram illustrating a solid state drive (SSD) system to which the storage device in accordance with an embodiment of the present disclosure is applied.

FIG. 15 is a block diagram illustrating a solid state drive (SSD) system 3000 to which the storage device in accordance with an embodiment of the present disclosure is applied.

Referring to FIG. 15, the SSD system 3000 may include a host 3100 and an SSD 3200. The SSD 3200 may exchange signals SIG with the host 3100 through a signal connector 3001 and may receive power PWR through a power connector 3002. The SSD 3200 may include an SSD controller 3210, a plurality of flash memories 3221 to 322n, an auxiliary power supply 3230, and a buffer memory 3240.

In an embodiment, the SSD controller 3210 may perform the function of the memory controller 200, described above with reference to FIG. 1.

The SSD controller 3210 may control the plurality of flash memories 3221 to 322n in response to the signals SIG received from the host 3100. In an embodiment, the signals SIG may be signals based on an interface between the host 3100 and the SSD 3200. For example, the signals SIG may be signals defined by at least one of various interfaces such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), Wi-Fi, Bluetooth, and nonvolatile memory express (NVMe) interfaces.

The auxiliary power supply 3230 may be coupled to the host 3100 through the power connector 3002. The auxiliary power supply 3230 may be supplied with power PWR from the host 3100, and may be charged by the power PWR. The auxiliary power supply 3230 may supply the power of the SSD 3200 when the supply of power from the host 3100 is not performed correctly. In an embodiment, the auxiliary power supply 3230 may be positioned inside the SSD 3200 or positioned outside the SSD 3200. For example, the auxiliary power supply 3230 may be disposed in a main board and may supply auxiliary power to the SSD 3200.

The buffer memory 3240 functions as a buffer memory of the SSD 3200. For example, the buffer memory 3240 may temporarily store data received from the host 3100 or data received from the plurality of flash memories 3221 to 322n or may temporarily store metadata (e.g., a mapping table) of the flash memories 3221 to 322n. The buffer memory 3240 may include volatile memories such as a DRAM, an SDRAM, a DDR SDRAM, an LPDDR SDRAM, and a GRAM or nonvolatile memories such as an FRAM, a ReRAM, an STT-MRAM, and a PRAM.

Figure 16:
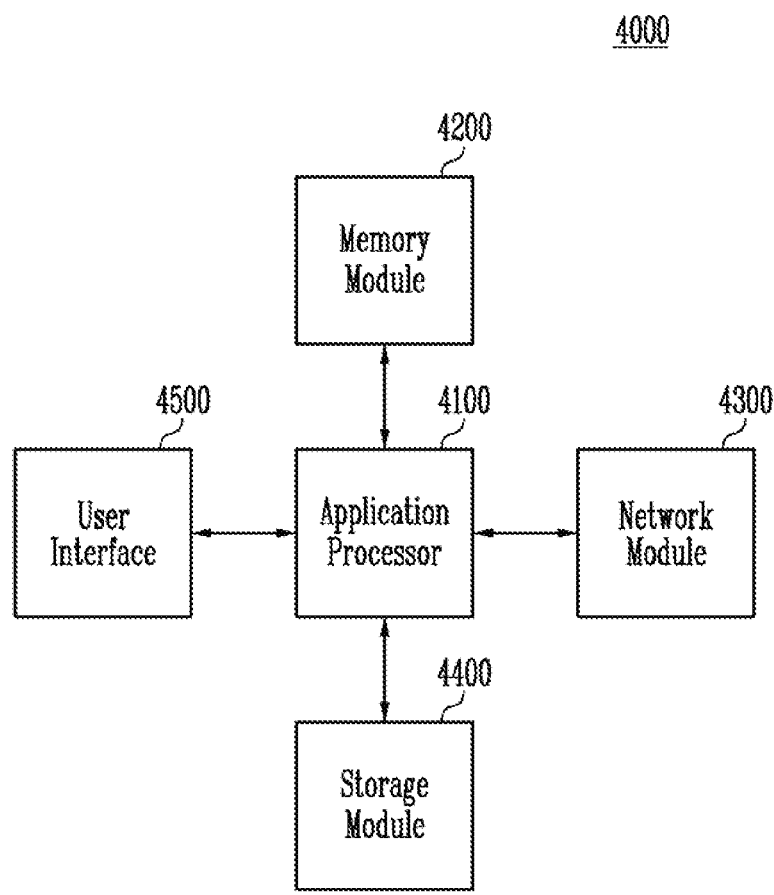
FIG. 16 is a block diagram illustrating a user system to which the storage device in accordance with an embodiment of the present disclosure is applied.

FIG. 16 is a block diagram illustrating a user system 4000 to which the storage device in accordance with an embodiment of the present disclosure is applied.

Referring to FIG. 16, the user system 4000 may include an application processor 4100, a memory module 4200, a network module 4300, a storage module 4400, and a user interface 4500.

The application processor 4100 may run components included in the user system 4000, an operating system (OS) or a user program. In an embodiment, the application processor 4100 may include controllers, interfaces, graphic engines, etc. for controlling the components included in the user system 4000. The application processor 4100 may be provided as a system-on-chip (SoC).

The memory module 4200 may function as a main memory, a working memory, a buffer memory, or a cache memory of the user system 4000. The memory module 4200 may include a volatile RAM such as a DRAM, an SDRAM, a DDR SDRAM, a DDR2 SDRAM, a DDR3 SDRAM, an LPDDR SDARM, an LPDDR2 SDRAM, and an LPDDR3 SDRAM, or a nonvolatile RAM such as a PRAM, a ReRAM, an MRAM, and an FRAM. In an embodiment, the application processor 4100 and the memory module 4200 may be packaged based on package-on-package (POP) and may then be provided as a single semiconductor package.

The network module 4300 may communicate with external devices. For example, the network module 4300 may support wireless communication, such as code division multiple access (CDMA), global system for mobile communication (GSM), wideband CDMA (WCDMA), CDMA-2000, time division multiple access (TDMA), long term evolution (LTE), WiMAX, WLAN, UWB, Bluetooth, or Wi-Fi communication. In an embodiment, the network module 4300 may be included in the application processor 4100.

The storage module 4400 may store data therein. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a phase-change RAM (PRAM), a magnetic RAM (MRAM), a resistive RAM (RRAM), a NAND flash memory, a NOR flash memory, or a NAND flash memory having a three-dimensional (3D) structure. In an embodiment, the storage module 4400 may be provided as a removable storage medium (i.e., removable drive), such as a memory card or an external drive of the user system 4000.

In an embodiment, the storage module 4400 may include a plurality of nonvolatile memory devices, and each of the plurality of nonvolatile memory devices may be operated in the same manner as that of the memory device 100 described above with reference to FIG. 1. The storage module 4400 may be operated in the same manner as that of the storage device 50 described above with reference to FIG. 1.

The user interface 4500 may include interfaces for inputting data or instructions to the application processor 4100 or outputting data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as an a liquid crystal display (LCD), an organic light emitting diode (OLED) display device, an active matrix OLED (AMOLED) display device, an LED, a speaker, and a monitor.

What is claimed is:

1. A memory controller configured to control a memory device including a first storage area and a second storage area, the memory controller comprising:
   a memory operation controller configured to control the memory device to perform a block merge operation of programming data stored in a victim block among normal blocks of the first storage area to a target block among the normal blocks, and configured to control the memory device to perform a data migration operation of copying data stored in blocks of the first storage area to blocks of the second storage area; and
   a block information manager configured to store block map information indicating whether each of the blocks of the first storage area is a normal block or a merge block,
   wherein the block merge operation changes the target block from a normal block to a merge block by reprogramming both the data stored in the victim block and data stored in the target block into the target block.

2. The memory controller according to claim 1, wherein the victim block is erased and is changed from a data block to a free block, after the block merge operation.

3. The memory controller according to claim 1,
wherein each of the normal blocks of the first storage area includes memory cells each of which stores n data bits (n is a natural number of 1 or more), and
wherein each of the blocks of the second storage area includes memory cells each of which stores m data bits (m is a natural number greater than n).

4. The memory controller according to claim 1, further comprising an idle period determiner configured to predict an idle period of the memory device based on a state of the memory device.

5. The memory controller according to claim 4, wherein the memory operation controller controls the memory device to perform the block merge operation based on a result of comparison between a value of the predicted idle period and a first threshold value, and controls the memory device to perform the data migration operation based on a result of comparison between the value of the predicted idle period and a second threshold value.

6. The memory controller according to claim 1, wherein the memory operation controller controls the memory device to perform the data migration operation when a number of merge blocks among the blocks of the first storage area is greater than or equal to a reference number.

7. The memory controller according to claim 1, wherein the block map information indicates whether each of the blocks of the first storage area is a free block or a data block.

8. The memory controller according to claim 1, wherein the memory operation controller controls the memory device to perform the data migration operation based on a result of comparison between a number of free blocks among the blocks of the first storage area and a first threshold number, and controls the block merge operation based on a result of comparison between the number of free blocks and a second threshold number.

9. A storage device comprising:
a memory device including a first storage area and a second storage area; and
a memory controller configured to control the memory device to perform a block merge operation of selecting a victim block and a target block from among normal blocks of the first storage area and reprogramming both data stored in the victim block and data stored in the target block into the target block, and configured to control the memory device to perform a data migration operation of copying data stored in blocks of the first storage area to blocks of the second storage area.

10. The storage device according to claim 9,
wherein each of the normal blocks of the first storage area includes memory cells each of which stores n data bits (n is a natural number of 1 or more), and
wherein each of the blocks of the second storage area includes memory cells each of which stores m data bits (m is a natural number greater than n).

11. The storage device according to claim 9, wherein the memory controller predicts an idle period of the memory device based on a state of the memory device, and controls the memory device to perform the block merge operation or the data migration operation based on a result of comparison between a value of the predicted idle period and a plurality of threshold values.

12. The storage device according to claim 9, wherein the memory controller stores block map information indicating at least either whether each of the blocks of the first storage area is a merge block that stores merged data or whether each of the blocks of the first storage area is a free block.

13. The storage device according to claim 12, wherein the memory controller controls the memory device to perform the data migration operation when a number of merge blocks among the blocks of the first storage area is greater than or equal to a reference number.

14. The storage device according to claim 12, wherein the memory controller controls the memory device to perform the block merge operation or the data migration operation based on a result of comparison between a number of free blocks among the blocks of the first storage area and a plurality of threshold numbers.

15. The storage device according to claim 9, wherein the memory controller stores block aging information indicating a final program elapsed time that is time elapsed after a last program operation of each of the normal blocks of the first storage area has been performed, and selects, as the target block, a block having a final program elapsed time shorter than a final program elapsed time of the victim block among the normal blocks of the first storage area.

16. The storage device according to claim 9, wherein the memory controller stores program-erase cycle information indicating a program-erase cycle of each of the normal blocks of the first storage area, and selects, as the target block, a block having a program-erase cycle higher than a program-erase cycle of the victim block among the normal blocks of the first storage area.

17. A method of operating a storage device including a first storage area and a second storage area, the method comprising:
performing a block merge operation of reprogramming data stored in a victim block among normal blocks of the first storage area and data stored in a target block into the target block among the normal blocks; and
performing a data migration operation of copying data stored in blocks of the first storage area to blocks of the second storage area,
wherein the target block is changed from a normal block to a merge block by the block merge operation.

18. The method according to claim 17, wherein the victim block is erased and is changed from a data block to a free block, after the block merge operation.

19. The method according to claim 17, further comprising predicting an idle period of the storage device based on a state of the storage device.

20. The method according to claim 19,
wherein the performing of the block merge operation comprises performing the block merge operation based on a result of comparison between a value of the predicted idle period and a first threshold value, and
wherein the performing of the data migration operation comprises performing the data migration operation based on a result of comparison between the value of the predicted idle period and a second threshold value different from the first threshold value.

21. The method according to claim 17, further comprising storing block map information indicating at least either whether each of the blocks of the first storage area is a merge block that stores merged data or whether each of the blocks of the first storage area is a free block.

22. The method according to claim 21,
wherein the performing of the block merge operation comprises performing the block merge operation based on a result of comparison between a number of free blocks among the blocks of the first storage area and a first threshold number, and
wherein the performing of the data migration operation comprises performing the data migration operation based on a result of comparison between the number of free blocks and a second threshold number different from the first threshold number.

23. The method according to claim 21, wherein the performing of the data migration operation comprises performing the data migration operation when a number of merge blocks among the blocks of the first storage area is greater than or equal to a reference number.

24. The method according to claim 17,
wherein each of the normal blocks of the first storage area includes memory cells each of which stores n data bits (n is a natural number of 1 or more), and
wherein each of the blocks of the second storage area includes memory cells each of which stores m data bits (m is a natural number greater than n).

* * * * *